United States Patent
Ishizuka et al.

(10) Patent No.: US 12,143,309 B2
(45) Date of Patent: Nov. 12, 2024

(54) INFORMATION PROCESSING APPARATUS AND NETWORK SYSTEM

(71) Applicant: NTT DOCOMO, INC., Chiyoda-ku (JP)

(72) Inventors: Hiroki Ishizuka, Chiyoda-ku (JP); Masashi Anzawa, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 18/041,011

(22) PCT Filed: Sep. 10, 2021

(86) PCT No.: PCT/JP2021/033346
§ 371 (c)(1),
(2) Date: Feb. 8, 2023

(87) PCT Pub. No.: WO2022/065080
PCT Pub. Date: Mar. 31, 2022

(65) Prior Publication Data
US 2023/0269196 A1    Aug. 24, 2023

(30) Foreign Application Priority Data
Sep. 24, 2020    (JP) ................. 2020-159648

(51) Int. Cl.
*H04L 47/80*    (2022.01)
*G06F 9/50*    (2006.01)
*H04L 67/61*    (2022.01)

(52) U.S. Cl.
CPC .......... *H04L 47/805* (2013.01); *G06F 9/5083* (2013.01); *H04L 67/61* (2022.05)

(58) Field of Classification Search
CPC .......................... H04L 47/805; G06F 9/5083
See application file for complete search history.

(56) References Cited

U.S. PATENT DOCUMENTS

| | | | |
|---|---|---|---|
| 2009/0016247 A1* | 1/2009 | Sood .................. | H04W 12/069 370/310 |
| 2012/0087344 A1* | 4/2012 | Sood ...................... | H04L 45/00 370/331 |

(Continued)

FOREIGN PATENT DOCUMENTS

| JP | 11-275145 A | 10/1999 |
|---|---|---|
| JP | 2018-512760 A | 5/2018 |

OTHER PUBLICATIONS

International Search Report issued Nov. 30, 2021 in PCT/JP2021/033346 filed on Sep. 10, 2021, 4 pages.

(Continued)

*Primary Examiner* — Kristie D Shingles
(74) *Attorney, Agent, or Firm* — Oblon, McClelland, Maier & Neustadt, L.L.P.

(57) ABSTRACT

A terminal device, which is connected to a network in which quality of communication is controlled, includes a communicator configured to communicate with a server apparatus connected to the network, and a requester configured to request, when the server apparatus provides the terminal device with a service, execution of quality control based on a condition being satisfied, the quality control being control of quality of communication with the server apparatus, the condition being a condition in which one, some, or all of a plurality of adjustment processing tasks are executable, and the plurality of adjustment processing tasks being processing tasks to adjust at least one of a resource for provision of the service and a resource for use of the service.

6 Claims, 7 Drawing Sheets

(56) References Cited

U.S. PATENT DOCUMENTS

2016/0112521 A1\* 4/2016 Lawson .................. H04L 67/02
                                                         709/227
2018/0191619 A1\* 7/2018 Karthikeyan ........... H04L 47/76
2020/0348662 A1\* 11/2020 Cella .................. G05B 23/0286
2021/0022024 A1\* 1/2021 Yao ................... H04W 36/0085

OTHER PUBLICATIONS

Japanese Office Action issued Jan. 23, 2024 in Japanese Patent Application No. 2022-551882 (with unedited computer-generated English translation), 8 pages.

\* cited by examiner

FIG. 3

| QUALITY MODE | HARDWARE ADJUSTMENT PROCESSING TASK | | |
|---|---|---|---|
| | COMMUNICATION DEVICE | PROCESSOR | STORAGE DEVICE |
| LOW LATENCY | • PROCESSING TO REDUCE INTERVALS OF DATA TRANSMISSION<br>• PROCESSING TO REDUCE SIZE OF TRANSMISSION DATA | • PROCESSING TO INCREASE CLOCK FREQUENCY<br>• MULTI-THREAD PROCESSING<br>• GPU CALL | — |
| HIGH SPEED AND LARGE CAPACITY | — | • PROCESSING TO INCREASE CLOCK FREQUENCY<br>• MULTI-THREAD PROCESSING<br>• GPU CALL | • USE OF SWAP MEMORY<br>• DELETION OF UNNECESSARY DATA<br>• ERASURE OF DATA ON MEMORY FOR OTHER PROCESSING |
| LOW SPEED | • PROCESSING TO INCREASE INTERVALS OF DATA TRANSMISSION<br>• PROCESSING TO INCREASE SIZE OF TRANSMISSION DATA | • PROCESSING TO DEDUCE CLOCK FREQUENCY<br>• SINGLE-THREADED ROCESSING | — |

FIG. 4

| QUALITY MODE | SOFTWARE ADJUSTMENT PROCESSING TASK |
|---|---|
| LOW LATENCY | ▪ STOP ON APPLICATION PROGRAM THAT IS NOT TARGET FOR QoS CONTROL<br>▪ USE OF UDP/QUIC<br>▪ PROCESSING TO MOVE PART OF PROCESSING BETWEEN TERMINAL DEVICE AND SERVER APPARATUS |
| HIGH SPEED AND LARGE CAPACITY | ▪ STOP ON APPLICATION PROGRAM THAT IS NOT TARGET FOR QoS CONTROL |
| LOW SPEED | ▪ PROCESSING TO LOWER PRIORITY LEVEL OF APPLICATION PROGRAM THAT IS A TARGET FOR QoS CONTROL |

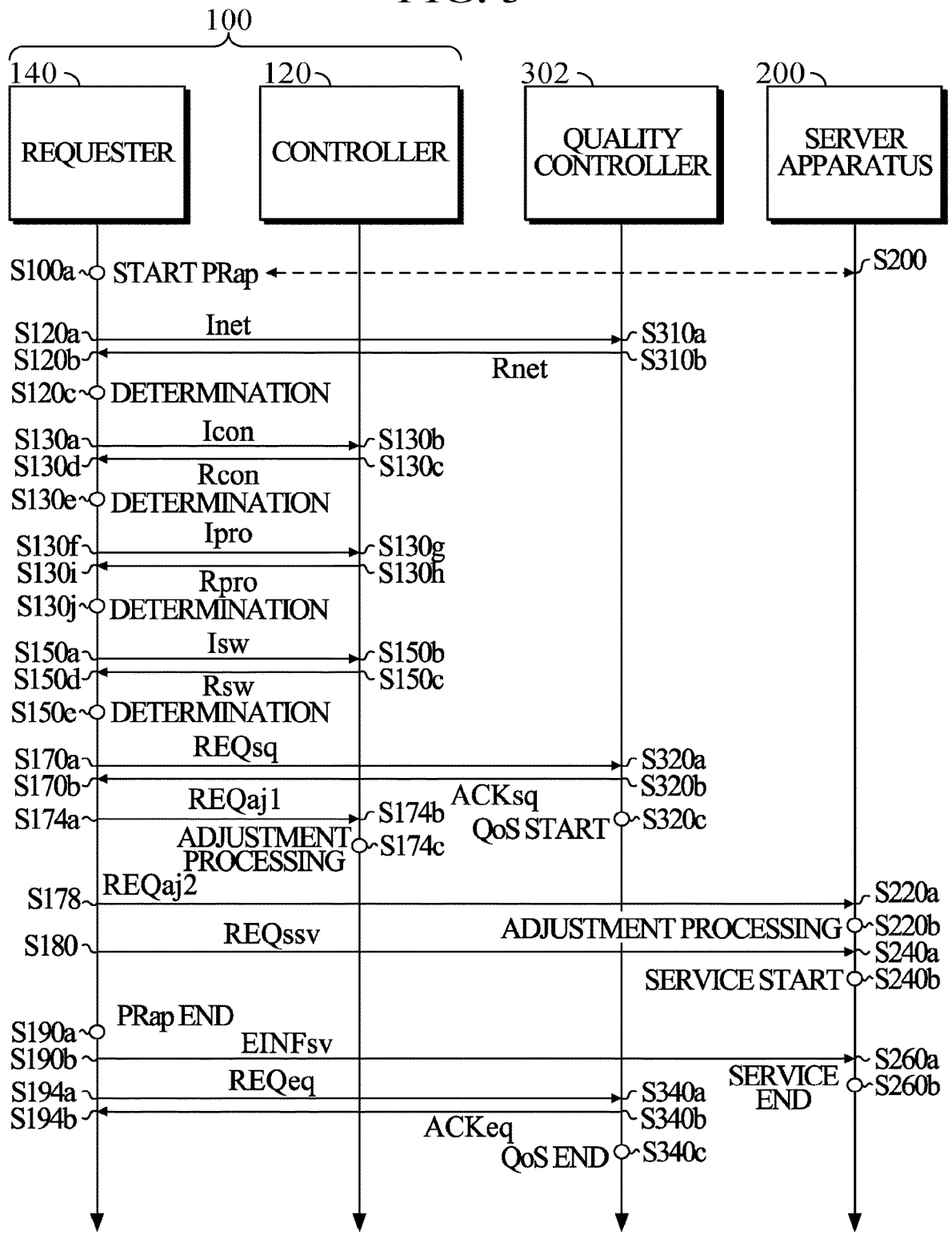

INFORMATION PROCESSING APPARATUS AND NETWORK SYSTEM

TECHNICAL FIELD

The present invention relates to an information processing apparatus and to a network system.

BACKGROUND ART

Control of quality of service (QoS) is known as a technique for ensuring quality of communication in a communication network, in other words, a network, etc. For example, a communication service quality control method is proposed that adjusts the quality of a communication service so as to maximize the quality of the communication service under predetermined resource conditions including a condition of central processing unit (CPU) usage in a terminal device and a condition of a transmission bandwidth of communication streams (for example, Patent Document 1).

RELATED ART DOCUMENT

Patent Document

Patent Document 1: Japanese Patent Application Laid-Open Publication No. H11-275145

SUMMARY OF THE INVENTION

Problem to be Solved by the Invention

In quality control, which is control of the quality of communication between multiple information processing apparatuses connected to a network, limited network resources are used. Therefore, it is desirable to execute quality control effectively.

Means for Solving Problem

To solve the above problem, an information processing apparatus according to a preferred mode of the present invention is an information processing apparatus connected to a network in which quality of communication is controlled, and the information processing apparatus includes: a communicator configured to communicate with a different information processing apparatus connected to the network; and a requester configured to request, when the different information processing apparatus provides the information processing apparatus with a service, execution of quality control based on a condition being satisfied, the quality control being control of quality of communication with the different information processing apparatus, the condition being a condition in which one, some, or all of a plurality of adjustment processing tasks are executable, and the plurality of adjustment processing tasks being processing tasks to adjust at least one of a resource for provision of the service and a resource for use of the service.

An information processing apparatus according to another mode of the present invention is an information processing apparatus connected to a network in which quality of communication is controlled, and the information processing apparatus includes: a communicator configured to communicate with a different information processing apparatus connected to the network; and a requester configured to request, when the information processing apparatus provides the different information processing apparatus with a service, execution of quality control based on a condition being satisfied, the quality control being control of quality of communication with the different information processing apparatus, the condition being a condition in which one, some, or all of a plurality of adjustment processing tasks are executable, and the plurality of adjustment processing tasks being processing tasks to adjust at least one of a resource for provision of the service and a resource for use of the service.

A network system according to a preferred mode of the present invention includes: a network in which quality of communication is controlled; a first information processing apparatus connected to the network; and a second information processing apparatus configured to provide the information processing apparatus with a service via the network, in which: the network includes a quality control system configured to execute quality control that is control of quality of communication between the first information processing apparatus and the second information processing apparatus, and the quality control system includes: a receiver configured to receive an execution request for execution of the quality control; and a responder configured to accept the execution request received by the receiver when one, some, or all of a plurality of adjustment processing tasks are executable, the plurality of adjustment processing tasks being processing tasks to adjust at least one of a resource for provision of the service between the first information processing apparatus and the second information processing apparatus and a resource for use of the service between the first information processing apparatus and the second information processing apparatus.

Effects of Invention

According to the present invention, it is possible to effectively execute quality control of communication between multiple information processing apparatuses.

BRIEF DESCRIPTION OF THE DRAWINGS

FIG. 3 is an explanatory diagram showing an example of a hardware adjustment processing task.

FIG. 4 is an explanatory diagram showing an example of a software adjustment processing task.

FIG. 5 is a sequence chart showing an example of an operation of the network system shown in FIG. 1.

MODES FOR CARRYING OUT THE INVENTION

1. Embodiment

Figure 1:
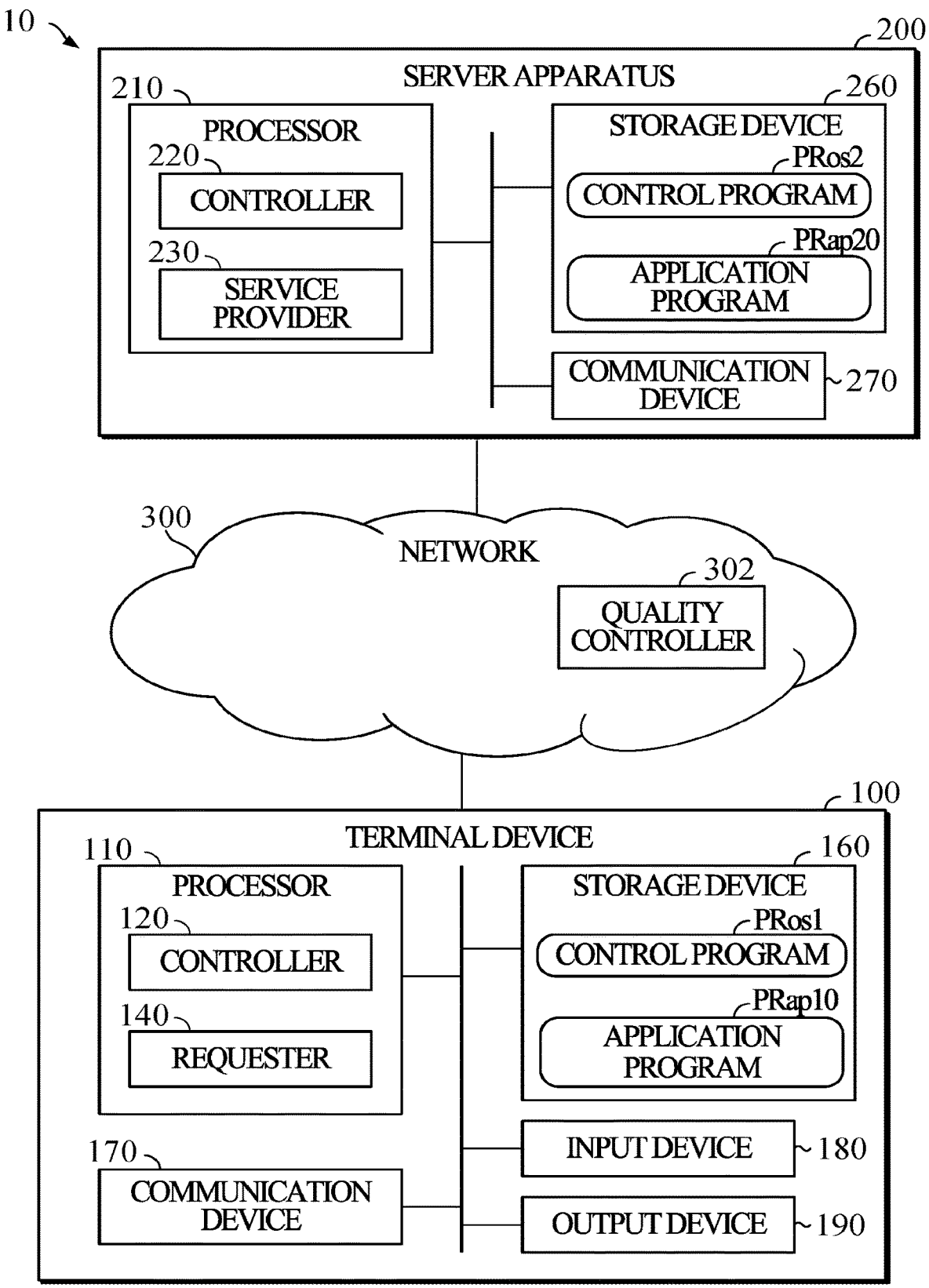
FIG. 1 is a block diagram showing an overall configuration of a network system according to an embodiment.

FIG. 1 is a block diagram showing an overall configuration of a network system 10 according to an embodiment. The network system 10 includes, for example, a network 300 in which the quality of communication is controlled, a terminal device 100 connected to the network 300, and a server apparatus 200 configured to provide the terminal device 100 with a predetermined service via the network 300. The predetermined service is not particularly limited, and the predetermined service may be, for example, an Internet Protocol (IP) telephone service, a video distribution service, an online game service, etc.

The terms "apparatus" and "device" in this specification may each be replaced with another term such as "circuit", "device", and "unit." In addition, a connection between the network 300 and the terminal device 100, etc., may be, for example, a connection using one of a wired network and a wireless network, or a connection using both of a wired network and a wireless network, as long as the connection allows a plurality of elements to communicate with each other. For example, the server apparatus 200 may be connected to the network 300 via the Internet (not shown).

The network 300, which is, for example, a telecommunication line such as a mobile communication network managed by a carrier, includes one or both of a wired network and a wireless network. For example, the network 300 provides the terminal device 100, the server apparatus 200, etc., with a communication service. The communication service may be a wireless communication service for a mobile communication system, such as a third generation mobile communication system (3G), a fourth generation mobile communication system (4G), and a fifth generation mobile communication system (5G), or alternatively, the communication service may be a wired communication service, for example. Alternatively, the communication service may be a service that includes both wireless and wired communication services.

For example, the network 300 includes a quality controller 302 configured to execute quality control that is control of the quality of communication provided by the communication service. In FIG. 1, to simplify the diagram, nodes (for example, base stations, etc.) other than the quality controller 302 among a plurality of nodes (devices) included in the network 300 are omitted. In the following, the quality control may be referred to as quality of service (QoS) control.

The QoS control includes, for example, bandwidth control, low latency control, priority control, etc. In the bandwidth control, for example, the bandwidth of communication in the network 300 is controlled. The bandwidth control may be a bandwidth guarantee in which a lower limit of a bandwidth is set, or the bandwidth control may be a bandwidth limit in which an upper limit of a bandwidth is set. Similarly, the low latency control may be, for example, a delay guarantee in which an upper limit on latency is set, or the low latency control may be a delay limit in which a lower limit of the latency is set. In the priority control, for example, packets related to a specific communication (units of data transferred for communication) are transferred as a priority. For example, packets flowing in the network 300 are each assigned a priority level, and packets with a higher priority level are processed before other packets.

In this embodiment, it is assumed that the QoS control is executable for each terminal device 100. The QoS control may be requested by the terminal device 100, or alternatively, the QoS control may be requested by the server apparatus 200. For example, when the terminal device 100 requests execution of the QoS control, the terminal device 100 corresponds to an "information processing apparatus" and the server apparatus 200 corresponds to a "different information processing apparatus." For example, when the server apparatus 200 requests execution of the QoS control, the server apparatus 200 corresponds to the "information processing apparatus" and the terminal device 100 corresponds to the "different information processing apparatus." In this embodiment, it is assumed that the terminal device 100 requests the execution of the QoS control.

The terminal device 100, which may be, for example, a freely selected information processing apparatus, may be a stationary information apparatus such as a personal computer, or a mobile information terminal apparatus such as a smartphone, a notebook computer, a wearable terminal apparatus, and a tablet terminal apparatus. In the following description, it is assumed that the terminal device 100 is a smartphone.

The terminal device 100 is, for example, realized by a computer system including a processor 110, a storage device 160, a communication device 170, an input device 180, and an output device 190. Multiple elements of the terminal device 100 are interconnected by a single bus or by multiple buses for communicating information. Each of the multiple elements of the terminal device 100 may be constituted by a single device or by multiple devices. Alternatively, one or some of the elements of the terminal device 100 may be omitted. The communication device 170 is an example of a "communicator."

The processor 110, which is a processor configured to control the entire terminal device 100, includes a single chip or multiple chips, for example. The processor 110 includes a central processing unit (CPU) including, for example, interfaces for peripheral devices, arithmetic units, registers, etc. One, some, or all of the functions of the processor 110 may be realized by hardware such as a digital signal processor (DSP), an application specific integrated circuit (ASIC), a programmable logic device (PLD), and a field programmable gate array (FPGA). The processor 110 executes various processing in parallel or sequentially.

The processor 110, for example, reads a control program PRos1 from the storage device 160, and the processor 110 executes the read control program PRos1 to function as a controller 120 configured to control the entire terminal device 100. For example, an operating system (OS) is used in the controller 120. In addition, the processor 110 reads an application program PRap10, which is to be used to use the predetermined service, from the storage device 160, and the processor 110 executes the read application program PRap10 to function as a requester 140, etc. In FIG. 1, functional blocks are omitted that are other than the requester 140 regarding a request for the QoS control among functional blocks realized by execution of the application program PRap10. The control program PRos1 and the application program PRap10 may be transmitted from another device.

The requester 140 requests the quality controller 302 to start or terminate the QoS control, for example. For example, when the server apparatus 200 provides the terminal device 100 with the predetermined service, the requester 140 requests the quality controller 302 to execute the QoS control in communication between the terminal device 100 and the server apparatus 200 to improve the quality of the predetermined service used by the terminal device 100. In a situation in which the quality of the predetermined service will not be improved even if the QoS control in the communication between the terminal device 100 and the server apparatus 200 is executed, the requester 140 may not request the execution of the QoS control.

For example, when the requester 140 determines that the effect of the QoS control on the communication between the terminal device 100 and the server apparatus 200 will not cause improvement in quality of the predetermined service, the requester 140 does not request the execution of the QoS control. In other words, when the requester 140 determines that the effect of the QoS control on the communication between the terminal device 100 and the server apparatus 200 will cause improvement in the quality of the predetermined service, the requester 140 requests the quality controller 302 to execute the QoS control.

A case in which it is determined that the effect of the QoS control will cause improvement in quality of the predetermined service is, for example, a case in which one, some, or all of a plurality of adjustment processing tasks are executable. The plurality of adjustment processing tasks are processing tasks to adjust at least one of a resource for provision of the predetermined service and a resource for use of the predetermined service. In other words, when the server apparatus 200 provides the terminal device 100 with the predetermined service, the requester 140 requests the execution of the QoS control based on a condition being satisfied. The QoS control is for control of the quality of the communication between the terminal device 100 and the server apparatus 200. The condition is a condition in which one, some, or all of the plurality of adjustment processing tasks are executable.

Thus, in this embodiment, when it is determined that the effect of the QoS control will cause improvement in quality of the predetermined service, the execution of the QoS control is required, whereas when it is determined that the effect of the QoS control will not cause improvement in quality of the predetermined service, the execution of the QoS control is not required. Accordingly, in this embodiment, it is possible to execute the QoS control in the communication between the terminal device 100 and the server apparatus 200 effectively. In other words, in this embodiment, it is possible to prevent a decrease in the effect of the QoS control on communication between the terminal device 100 and the server apparatus 200.

Examples of the resource for the provision of the predetermined service include hardware resources of the server apparatus 200, resources of the network 300, etc. Examples of the resource for the use of the predetermined service include hardware resources of the terminal device 100, the resources of the network 300, etc. The resources of the network 300 are used for each of the provision of the predetermined service and the use of the predetermined service. Examples of the hardware resources of the terminal device 100 include the processor 110, the storage device 160, the communication device 170, etc. Examples of the hardware resources of the server apparatus 200 include a processor 210, a storage device 260, and a communication device 270, which will be described below.

The plurality of adjustment processing tasks includes, for example, not only a network adjustment processing task to adjust the resources of the network 300, but also a hardware adjustment processing task to adjust the hardware resources of at least one of the terminal device 100 and the server apparatus 200. In addition, the plurality of adjustment processing tasks may include, for example, a software adjustment processing task, which is a processing task for software executed by at least one of the terminal device 100 and the server apparatus 200. The software may be, for example, an application program PRap related to the predetermined service (for example, the application program PRap10, etc.), or alternatively, the software may be an application program PRap unrelated to the predetermined service.

In the following, the hardware adjustment processing task to adjust the hardware resources of the terminal device 100 may be referred to as a first hardware adjustment processing task, and the hardware adjustment processing task to adjust the hardware resources of the server apparatus 200 may be referred to as a second hardware adjustment processing task. Similarly, in the following, the software adjustment processing task for the software executed by the terminal device 100 may be referred to as a first software adjustment processing task, and the software adjustment processing task for the software executed by the server apparatus 200 may be referred to as a second software adjustment processing task. Details of the hardware adjustment processing task, which are explained with reference to FIG. 3, will be described below, and details of the software adjustment processing task, which are explained with reference to FIG. 4, will be described below.

The storage device 160, which is a recording medium readable by the processor 110, is configured to store various data such as a plurality of programs including the control program PRos1 and the application program PRap10, which are to be executed by the processor 110. The storage device 160 may include, for example, at least one of a read only memory (ROM), an erasable programmable ROM (EPROM), an electrically erasable programmable ROM (EEPROM), a random access memory (RAM), etc. The storage device 160 may be referred to as a register, a cache, a main memory (main storage device), etc.

The communication device 170 is hardware (transmitter and receiver device; transceiver device) such as a modem chip for communicating with other devices such as the server apparatus 200 and the quality controller 302. The communication device 170 may be referred as, for example, a network device, a network controller, a network card, a communication module, etc. The communication device 170 may be include a high-frequency switch, a duplexer, a filter, a frequency synthesizer, etc., to realize one or both of a frequency division duplex (FDD) and a time division duplex (TDD), for example.

The input device 180 is an input device (for example, a keyboard, a mouse, a microphone, a switch, a button, a sensor, etc.) configured to accept input from the outside. For example, the input device 180 accepts operations for inputting a symbol such as a numeral and a letter into the processor 110, and operations for selecting an icon displayed on a screen of the terminal device 100. For example, a touch panel configured to detect contact with the screen of the terminal device 100 is suitable as the input device 180. The input device 180 may include a plurality of operation elements capable of being operated by a user.

The output device 190 is an output device, such as a display, configured to execute output to the outside. The output device 190 displays images, for example, under the control of the processor 110. For example, various display panels, such as liquid crystal display panels, and organic electroluminescent (EL) display panels, are suitably used as the output device 190. The input device 180 and the output device 190 may be in an integrated configuration (for example, a touch panel). The output device 190 may be an output device including a loudspeaker, a light emitting diode (LED) lamp, etc.

The server apparatus 200 may be, for example, a freely selected information processing apparatus. For example, the server apparatus 200 is realized by a computer system including the processor 210, the storage device 260, and the communication device 270.

The processor 210, which is a processor configured to control the entire server apparatus 200, includes a configuration that is similar to a configuration of the processor 110 of the terminal device 100 described above. For example, the processor 210 reads a control program PRos2 from the storage device 260, and the processor 210 executes the read control program PRos2 to function as a controller 220 configured to control the entire server apparatus 200. For example, an OS may be used in the controller 220.

In addition, the processor 210 reads an application program PRap20, which is to be used to provide the predetermined service, from the storage device 260, and the processor 210 executes the read application program PRap20 to function as a service provider 230. The service provider 230 is configured to provide the predetermined service for the terminal device 100, which is executing the application program PRap10, via the network 300, for example. The control program PRos2 and the application program PRap20 may be transmitted from another device.

The storage device 260, which is a recording medium readable by the processor 210, is configured to store various data such as a plurality of programs including the control program PRos2 and the application program PRap20, which are to be executed by the processor 210. The storage device 260, as in the storage device 160 of the terminal device 100 described above, may include, for example, at least one of a ROM, an EPROM, an EEPROM, a RAM, etc.

The communication device 270, which is hardware (transceiver device) such as a modem chip for communicating with other devices such as the terminal device 100 and the quality controller 302, includes a configuration that is similar to a configuration of the communication device 170 described above.

The server apparatus 200 may be an information processing apparatus for realizing a multi-access edge computing (MEC), for example. The MEC is a system for placing a computer system, such as a server and a storage, at a location closer to a user in a telecommunication line, such as a mobile communication network. The placement of the server apparatus 200 at a location closer to the terminal device 100 not only tends to decrease latency in communication, but also tends to decrease the amount of packets flowing in the network 300.

The quality controller 302 executes the QoS control, which is control of the quality of the communication between the terminal device 100 and the server apparatus 200, in response to a request for the QoS control from the terminal device 100, etc., for example. A configuration of the quality controller 302, which is explained with reference to FIG. 2, will be described below.

A configuration of the network system 10 is not limited to an example shown in FIG. 1. For example, a plurality of terminal devices 100 may be connected to the network 300, or alternatively, a plurality of server apparatuses 200 may be connected to the network 300. In addition, for example, the server apparatus 200 may include an input device and an output device, as well as the terminal device 100. In addition, for example, the terminal device 100 may include an auxiliary storage device. The auxiliary storage device, which is a recording medium readable by the terminal device 100, may include, for example, at least one of an optical disc, such as a compact disc ROM (CD-ROM), a hard disk drive, a flexible disc, a magneto-optical disk (for example, a compact disc, a digital versatile disc, or a Blu-ray (registered trademark) disc), a smart card, a flash memory (for example, a card, a stick, or a key drive), a floppy (registered trademark) disk, a magnetic strip, etc. Similarly, the server apparatus 200 may include an auxiliary storage device. The auxiliary storage device may be referred to as a storage.

Figure 2:
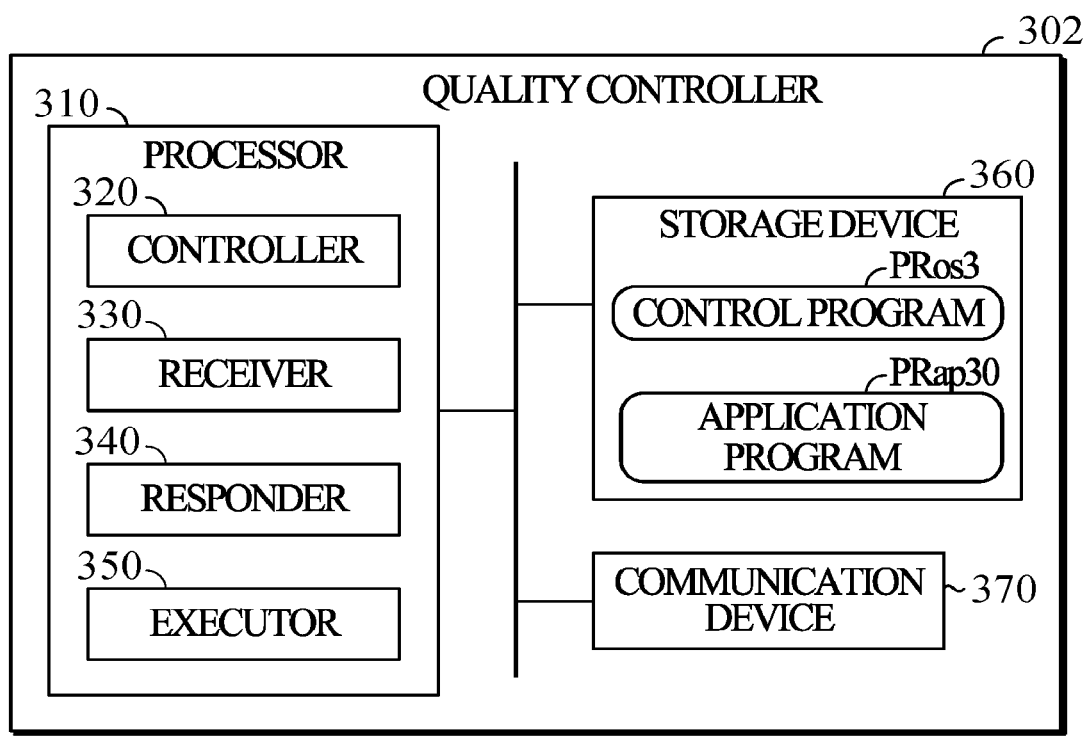
FIG. 2 is a block diagram showing a configuration of a quality controller shown in FIG. 1.

FIG. 2 is a block diagram showing a configuration of the quality controller 302 shown in FIG. 1.

The quality controller 302 may be a freely selected information processing apparatus, as well as the server apparatus 200, for example. For example, the quality controller 302 is realized by a computer system including a processor 310, which is configured to control the entire quality controller 302, a storage device 360, which is configured to store various data, and a communication device 370, which is configured to communicate with other devices.

The processor 310, which is a processor configured to control the entire quality controller 302, includes a configuration that is similar to a configuration of the processor 110 of the terminal device 100 described above. For example, the processor 310 reads a control program PRos3 from the storage device 260, and the processor 310 executes the read control program PRos3 to function as a controller 320 configured to control the entire quality controller 302. For example, an OS may be used in the controller 320.

In addition, the processor 310 reads an application program PRap30, which is to be used to execute the QoS control, from the storage device 260, and the processor 310 executes the read application program PRap30 to function as a receiver 330, a responder 340, an executor 350, etc. The receiver 330 is configured to receive, for example, a request for the QoS control. The responder 340 is configured to: determine whether to accept the request for the QoS control; and notify a requester of the QoS control (for example, terminal device 100) about the determination result, for example. The executor 350 is configured to execute the QoS control, for example. The control program PRos3 and the application program PRap30 may be transmitted from another device.

The storage device 360, which is a recording medium readable by the processor 310, is configured to store various data such as a plurality of programs including the control program Pros3 and the application program PRap30, which are to be executed by the processor 310. The storage device 360, as in the storage device 160 of the terminal device 100 described above, may include, for example, at least one of a ROM, an EPROM, an EEPROM, a RAM, etc.

The communication device 370, which is hardware (transceiver device) such as a modem chip for communicating with other devices such as the terminal device 100 and the server apparatus 200, includes a configuration that is similar to the configuration of the communication device 170 described above.

The quality controller 302 may be realized by a single device or by a set of a plurality of devices separate from each other (in other words, a system). For example, a function of receiving a request for the QoS control (for example, the receiver 330, the responder 340, etc.), a function of executing the QoS control (for example, the executor 350), etc., may be executed by a single device. Alternatively, the function of receiving a request for the QoS control, the function of executing the QoS control, etc., may be executed by a set of two separate devices. Alternatively, the quality controller 302 may include a plurality of devices that executes the QoS control.

The configuration of the quality controller 302 is not limited to an example shown in FIG. 2. For example, the quality controller 302 may include an auxiliary storage device. In addition, the quality controller 302 may include an input device and an output device, which are respectively similar to the input device 180 and the output device 190 described in FIG. 1.

FIG. 3 is an explanatory diagram showing an example of the hardware adjustment processing task. The hardware adjustment processing task includes, for example, an adjustment processing task for the communication device 170 or 270, an adjustment processing task for the processor 110 or 210, an adjustment processing task for the storage device 160 or 260, etc.

In the example shown in FIG. 3, the hardware adjustment processing task, which is to be executed in response to the QoS control being requested, is selected based on a quality mode of the QoS control (for example, low latency, high speed and large capacity, low speed, etc.). For example, the quality modes include a low latency mode, in which latency of data is small compared to latency in communication in other quality modes, a high speed and large capacity mode, in which a large amount of data can be transferred at high speed compared to an amount of data transferred in other quality modes, a low speed mode, in which communication speed is slow compared to other quality modes, etc. For example, in the QoS control in the low latency mode, a low latency control may be executed that is a delay guarantee in which an upper limit on latency is set. For example, in the QoS control in the high speed and large capacity mode, a bandwidth control may be executed that is a bandwidth guarantee in which a lower limit of a bandwidth is set. For example, in the QoS control in the low speed mode, a bandwidth limit may be executed in which an upper limit of a bandwidth is set. The quality mode may be specified, for example, by the terminal device 100 or by a server such as the server apparatus 200. Alternatively, the quality mode may be specified by a device included in the network 300 (not shown; different from the quality controller 302). The quality mode may be specified by specifying a QoS Class Identifier (QCI), for example. The quality mode is not limited to each of the examples described above. For example, the quality mode may include a best effort mode, in which control is based on best-effort.

In FIG. 3, among the first hardware adjustment processing task (adjustment processing task for each of the communication device 170, the processor 110, and the storage device 160) and the second hardware adjustment processing task (adjustment processing task for each of the communication device 270, the processor 210, and the storage device 260), the first hardware adjustment processing task will be mainly described.

When the quality mode is the low latency mode, the adjustment processing task for the communication device 170 includes processing to set the intervals of transmission of data to be less than a predetermined time period, processing to set a size of transmission data to be less than a predetermined size, etc., for example. The predetermined time period and the predetermined size may be determined based on delay time guaranteed in the low latency mode, for example. When the quality mode is the high speed and large capacity mode, the adjustment processing task for the communication device 170 may not be executed. When the quality mode is the low speed mode, the adjustment processing task for the communication device 170 includes processing to set the intervals of transmission of data to be greater than a predetermined time period, processing to set a size of transmission data to be greater than a predetermined size, etc., for example. The predetermined time period and the predetermined size may be determined based on the bandwidth limitation in the low speed mode, etc., for example.

When the quality mode is the low latency mode, or is the high speed and large capacity mode, the adjustment processing task for the processor 110 includes processing to set a clock frequency (for example, an operating frequency of the processor 110) to be higher than a predetermined frequency, multi-thread processing, a GPU call, etc., for example. The predetermined frequency may be a lower limit of an operating frequency required to use the predetermined service, for example. The multi-thread processing may be multi-thread processing by which an application program PRap, which is a target for the QoS control, is executed, for example. The GPU call may be a change of a module, which executes image processing etc., from a CPU to a GPU, for example. When the quality mode is the low speed mode, the adjustment processing task for the processor 110 includes, for example, processing to set the clock frequency to be lower than a predetermined frequency, single-thread processing, etc., for example. The predetermined frequency may be determined based on, for example, the bandwidth limitation in the low speed mode, etc. The single-threaded processing may be single-threaded processing by which an application program PRap, which is a target for the QoS control, is executed, for example.

When the quality mode is the high speed and large capacity mode, the adjustment processing task for the storage device 160 includes use of swap memory, deletion of unnecessary data, erasure of data in a memory for other processing, etc., for example. The erasure of data in a memory for other processing may be erasure of data in a memory used for processing based on an application program PRap other than the application program PRap that is a target for the QoS control. Amount of free memory obtained by the adjustment processing task for the storage device 160 may be a lower limit of amount of free memory required to use the predetermined service, for example. When the quality mode is the low latency mode, or is the low speed mode, the adjustment processing task for the storage device 160 may not be executed.

Processing included in the first hardware adjustment processing task is not limited to the example shown in FIG. 3. For example, the first hardware adjustment processing task may include processing other than the processing shown in FIG. 3 instead of the processing shown in FIG. 3. Alternatively, the first hardware adjustment processing task may include not only some or all of the processing shown in FIG. 3, but also processing other than the processing shown in FIG. 3. When the processor 110 includes multiple CPU cores, the processing other than the processing shown in FIG. 3 may be processing to change a CPU core allocated to processing that is being executed, for example.

The contents of the second hardware adjustment processing task may be similar to, or may be different from, that of the first hardware adjustment processing task. For example, when the second hardware adjustment processing task is similar to the first hardware adjustment processing task, the adjustment processing task for the communication device 270 is similar to the adjustment processing task for the communication device 170, the adjustment processing task for the processor 210 is similar to the adjustment processing task for the processor 110, and the adjustment processing task for the storage device 260 is similar to the adjustment processing task for the storage device 160.

FIG. 4 is an explanatory diagram showing an example of the software adjustment processing task. In the example shown in FIG. 4, the software adjustment processing task, which is to be executed in response to the QoS control being requested, is selected based on the quality mode of the QoS control.

The soft adjustment processing task is, for example, processing adjust a resource for software, such as the application program PRap. When the quality mode is the low latency mode, the software adjustment processing task includes, for example, processing to stop an application program PRap, which is not a target for the QoS control, processing to use User Datagram Protocol (UDP)/Quick UDP Internet Connections (QUIC), processing to be executed a combination of the terminal device 100 and the server apparatus 200, etc. When the quality mode is the high speed and large capacity mode, the software adjustment processing task includes, for example, the stop on the application program PRap, which is not a target for the QoS control, etc. When the quality mode is the low speed mode, the software adjustment processing task includes, for example, processing to lower a priority level of the application program PRap, which is a target for the QoS control.

Processing included in the software adjustment processing task is not limited to the example shown in FIG. 4. For example, the software adjustment processing task may include processing other than the processing shown in FIG. 4, instead of the processing shown in FIG. 4. Alternatively, the software adjustment processing task may include not only some or all of the processing shown in FIG. 4, but also processing other than the processing shown in FIG. 4. When a limit function, such as a function of the controller 120 to save (reduce) the amount of communication data (so-called data saver) and a function of the controller 120 to reduce power consumption (so-called battery saver), is available, the processing other than the processing shown in FIG. 4 may be processing to change the limit function to be unavailable, for example. For example, in the QoS control in the high speed and large capacity mode, a data saver, etc., are changed to be unavailable.

In FIG. 4, the first software adjustment processing task and the second software adjustment processing task are described without distinction therebetween; however, the contents of the first software adjustment processing task may be similar to, or may be different from, those of the second software adjustment processing task.

As a quality mode of the QoS control required to improve the quality of the predetermined service, the quality mode appropriate for the predetermined service is considered to be selected. Accordingly, the hardware adjustment processing task and the software adjustment processing task, which are to be executed in response to the QoS control being requested, may be selected based on the predetermined service.

FIG. 5 is a sequence chart showing an example of an operation of the network system 10 shown in FIG. 1.

In the example shown in FIG. 5, it is assumed that the QoS control in the low latency mode is requested. When the quality mode of the QoS control is the low latency mode, the adjustment processing task for the storage device 160 and the adjustment processing task for the storage device 260 in the hardware adjustment processing task shown in FIG. 3 may not be executed. Accordingly, in the operation shown in FIG. 5, no inquiry is made as to whether the adjustment processing task for the storage device 160 and the adjustment processing task for the storage device 260 are executable.

In the example shown in FIG. 5, it is assumed that the network adjustment processing task, the adjustment processing task for the communication device 170, the adjustment processing task for the processor 110, and the first software adjustment processing task are each a first processing task to allocate resources required for the use of the predetermined service. In addition, in the example shown in FIG. 5, it is assumed that the adjustment processing task for the communication device 270, the adjustment processing task for the processor 210, and the second software adjustment processing task are each a second processing task to allocate resources recommended for the use of the predetermined service. In this case, for example, the adjustment processing task for the storage device 160 and the adjustment processing task for the storage device 260 are each a processing task that corresponds to neither the first processing task nor the second processing task.

The resources required for the use of the predetermined service may be determined based on a minimal system condition (system functions, system performance, etc.) required for the use of the predetermined service, for example. The resources recommended for the use of the predetermined service may be determined based on a system condition for the use of the predetermined service of standard quality or of highest quality, for example. The minimal system condition required for the use of the predetermined service, and the system condition for the use of the predetermined service of standard quality or of highest quality may be information disclosed by a service providing company that provides the predetermined service.

In this embodiment, it is assumed that the execution of the QoS control is requested when all of the first processing tasks based on the quality mode of the QoS control, etc., are executable. Thus, in the operation shown in FIG. 5, the execution of the QoS control is requested when all of the network adjustment processing task, the adjustment processing task for the communication device 170, the adjustment processing task for the processor 110, and the first software adjustment processing task are executable. In FIG. 5, the operation of the network system 10 is described in a situation in which all of the network adjustment processing task, the adjustment processing task for the communication device 170, the adjustment processing task for the processor 110, and the first software adjustment processing task are executable.

First, the terminal device 100 starts the application program PRap10, which is to be used to use the predetermined service (S100*a*). This allows the terminal device 100 and the server apparatus 200 to communicate with each other (S200).

Next, the requester 140 of the terminal device 100 transmits inquiry information Inet to the quality controller 302 to inquire whether the network adjustment processing task to adjust the resources of the network 300 is executable (S120*a*). Thus, the receiver 330 of the quality controller 302 acquires the inquiry information Inet (S310*a*).

The network adjustment processing task includes, for example, parameter setting processing, route setting processing, priority control processing, etc. The parameter setting processing is, for example, processing to change a frequency band, network parameters, etc., which are allocated for communication between the terminal device 100 and the server apparatus 200, in accordance with the quality mode of the QoS control. The network parameters include, for example, the transmission intervals of packets.

The route setting processing is, for example, processing to change a communication route between the terminal device 100 and the server apparatus 200 to a stable route or the shortest route. When multiple server apparatuses 200, which each provide the predetermined service, are connected to the network 300, the route setting processing may include processing to select a server apparatus 200, which provides the predetermined service for the terminal device 100, from among the multiple server apparatuses 200. For example, the server apparatus 200 may be a server apparatus 200 with a low failure rate, or may be a server apparatus 200 located close to the terminal device 100.

For example, in the priority control processing, priority control is executed to realize low delay, high speed and large capacity, multiple connections, etc. The network adjustment processing task is executed by, for example, the quality controller 302.

The responder 340 of the quality controller 302 confirms whether the network adjustment processing task is executable to transmit reply information Rnet, which indicates the result of the confirmation, to the requester 140 of the terminal device 100 (S310b). Thus, the requester 140 of the terminal device 100 acquires the reply information Rnet as a response to the inquiry information Inet (S120b).

The requester 140 of the terminal device 100 determines, based on the reply information Rnet acquired from the quality controller 302, whether the network adjustment processing task is executable (S120c). In the following, the determination of whether the adjustment processing task is executable may be referred to as a determination for an adjustment processing task. Based on the requester 140 determining that the network adjustment processing task is not executable, the requester 140 terminates the processing related to the request for the QoS control without requesting the QoS control. In the example shown in FIG. 5, it is assumed that the requester 140 determines that the network adjustment processing task is executable; accordingly, a determination is made as to whether the adjustment processing task for the communication device 170 is executable.

For example, the requester 140 of the terminal device 100 transmits inquiry information Icon to the controller 120 to inquire whether the adjustment processing task for the communication device 170 is executable (S130a). Thus, the controller 120 acquires the inquiry information Icon (S130b). The controller 120 confirms whether the adjustment processing task for the communication device 170 is executable to transmit reply information Rcon, which indicates the result of the confirmation, to the requester 140 (S130c). Thus, the requester 140 acquires the reply information Rcon as a response to the inquiry information Icon (S130d).

The requester 140 of the terminal device 100 determines, based on the reply information Rcon acquired from the controller 120, whether the adjustment processing task for the communication device 170 is executable (S130e). Based on the requester 140 determining that the adjustment processing task for the communication device 170 is not executable, the requester 140 terminates the processing related to the request for the QoS control without requesting the QoS control. In the example shown in FIG. 5, it is assumed that the requester 140 determines that the adjustment processing task for the communication device 170 is executable; accordingly, a determination is made as to whether the adjustment processing task for the processor 110 is executable.

For example, the requester 140 of the terminal device 100 transmits inquiry information Ipro to the controller 120 to inquire whether the adjustment processing task for the processor 110 is executable (S130f). Thus, the controller 120 acquires the inquiry information Ipro (S130g). The controller 120 confirms whether the adjustment processing task for the processor 110 is executable to transmit reply information Rpro, which indicates the result of the confirmation, to the requester 140 (S130h). Thus, the requester 140 acquires the reply information Rpro as a response to the inquiry information Ipro (S130i).

The requester 140 of the terminal device 100 determines, based on the reply information Rpro acquired from the controller 120, whether the adjustment processing task for the processor 110 is executable (S130j). Based on the requester 140 determining that the adjustment processing task for the processor 110 is not executable, the requester 140 terminates the processing related to the request for the QoS control without requesting the QoS control. In the example shown in FIG. 5, it is assumed that the requester 140 determines that the adjustment processing task for the processor 110 is executable; accordingly, a determination is made as to whether the first software adjustment processing task is executable.

For example, the requester 140 of the terminal device 100 transmits inquiry information Isw to the controller 120 to inquire whether the first software adjustment processing task is executable (S150a). Thus, the controller 120 acquires the inquiry information Isw (S150b). The controller 120 confirms whether the first software adjustment processing task is executable to transmit reply information Rsw, which indicates the result of the confirmation, to the requester 140 (S150c). Thus, the requester 140 acquires the reply information Rsw as a response to the inquiry information Isw (S150d).

The requester 140 of the terminal device 100 determines, based on the reply information Rsw acquired from the controller 120, whether the first software adjustment processing task is executable (S150e). Based on the requester 140 determining that the first software adjustment processing task is not executable, the requester 140 terminates the processing related to the request for the QoS control without requesting the QoS control. In the example shown in FIG. 5, it is assumed that the requester 140 determines that the first software adjustment processing task is executable; accordingly, execution of the QoS control is requested.

For example, the requester 140 of the terminal device 100 transmits a start request REQsq to the quality controller 302 to start the QoS control because all of the network adjustment processing task, the adjustment processing task for the communication device 170, the adjustment processing task for the processor 110, and the first software adjustment processing task are executable (S170a). Thus, the receiver 330 of the quality controller 302 acquires the start request REQsq (S320a).

When the QoS control in response to the start request REQsq is to be executed, the responder 340 of the quality controller 302 provides the terminal device 100 with an acknowledgement response ACKsq to the start request REQsq (S320b). Then, the executor 350 of the quality controller 302 starts the QoS control in the quality mode indicated by the start request REQsq (S320c). Thus, the quality controller 302 executes the QoS control, which is control of the quality of the communication between the terminal device 100 and the server apparatus 200, based on the start request REQsq. In other words, the start request REQsq corresponds to an execution request for the execution of the QoS control. In this embodiment, the network adjustment processing task is included in the QoS control. Accordingly, the network adjustment processing task is executed in conjunction with the execution of the QoS control.

In addition, the requester 140 of the terminal device 100 acquires the acknowledgement response ACKsq as a response to the start request REQsq for the QoS control (S170b). Then, the requester 140 transmits an adjustment request REQaj1 to the controller 120 to request execution of the adjustment processing task (the adjustment processing task for the communication device 170, the adjustment processing task for the processor 110, the first software adjustment processing task, etc.) to adjust the resources of the terminal device 100 (S174a). Thus, the controller 120 acquires the adjustment request REQaj1 (S174b). Then, the controller 120 executes the adjustment processing task, such as the adjustment processing task for the communication device 170, the adjustment processing task for the processor 110, and the first software adjustment processing task. (S174c). As a result, the resources of the terminal device 100 are allocated so as to fully use the predetermined service provided by the server apparatus 200.

In addition, the requester 140 of the terminal device 100 transmits an adjustment request REQaj2 to the server apparatus 200 to request execution of the adjustment processing task (the adjustment processing task for the communication device 270, the adjustment processing task for the processor 210, and the second software adjustment processing task) to adjust the resources of the server apparatus 200 (S178). Thus, the server apparatus 200 acquires the adjustment request REQaj2 (S220a). Then, the controller 220 of the server apparatus 200 executes one or more adjustment processing tasks, which are executable, among the adjustment processing task for the communication device 270, the adjustment processing task for the processor 210, and the second software adjustment processing task (S220b). As a result, the resources of the server apparatus 200 are allocated so as to provide the terminal device 100 with the predetermined service of as high a quality as possible.

The requester 140 of the terminal device 100 transmits a service request REQssv to the server apparatus 200 to request the start of the predetermined service (S180). Thus, the server apparatus 200 acquires the service request REQssv (S240a). Then, the service provider 230 of the server apparatus 200 starts providing the predetermined service (S240b). Thus, the predetermined service is provided for the terminal device 100.

The terminal device 100 starts processing to terminate the application program PRap10 (S190a). Thus, the application program PRap10 terminates after termination information EINFsv and a termination request REQeq have transmitted. The termination information EINFsv, which is information indicative of the termination of the application program PRap10 that is used to use the predetermined service, is transmitted from the terminal device 100 to the server apparatus 200 (S190b). The termination request REQeq, which is information indicative of a request for the termination of the QoS control for the communication between the terminal device 100 and the server apparatus 200, is transmitted from the terminal device 100 to the quality controller 302 (S194a).

For example, the service provider 230 of the server apparatus 200 acquires the termination information EINFsv transmitted from the terminal device 100 (S260a). Then, the service provider 230 of the server apparatus 200 terminates the provision of the predetermined service (S260b).

For example, the receiver 330 of the quality controller 302 acquires the termination request REQeq transmitted from the terminal device 100 (S340a). Then, to terminate the QoS control indicated by the termination request REQeq, the responder 340 of the quality controller 302 provides the requester 140 of the terminal device 100 with an acknowledgement response ACKeq to the termination request REQeq (S340b). Thus, the terminal device 100 acquires the acknowledgement response ACKeq as a response to the termination request REQeq for the QoS control (S194b). In addition, the executor 350 of the quality controller 302 terminates the QoS control indicated by the termination request REQeq (S340c). Accordingly, the QoS control for communication between the terminal device 100 and the server apparatus 200 is terminated.

Thus, in this embodiment, the requester 140 of the terminal device 100 requests the execution of the QoS control when the state of the terminal device 100, etc., enters a state in which the service provided by the server apparatus 200 can be fully used. In other words, the requester 140 does not request the execution of the QoS control when the state of the terminal device 100, etc., is not in the state in which the service provided by the server apparatus 200 can be fully used. Thus, the QoS control can be effectively executed in this embodiment.

In the operation shown in FIG. 5, the requester 140 of the terminal device 100 determines, in predetermined sequence, whether the network adjustment processing task, the adjustment processing task for the communication device 170, the adjustment processing task for the processor 110, and the first software adjustment processing task are executable. The predetermined sequence may be a descending order of probability that the execution of each adjustment processing task is impossible.

For example, in the network adjustment processing task, it is difficult to accurately predict the effects of communication by a terminal device 100, etc., other than the terminal device 100 that requests the QoS control. Accordingly, it is considered that the probability that the network adjustment processing task will be determined to be impossible will be greater than the probability that each of the hardware adjustment processing task and the software adjustment processing task will be determined to be impossible. In addition, for example, the software adjustment processing task is processing for software; thus, the software adjustment processing task is capable of being flexibly handled compared to the hardware adjustment processing task. Accordingly, it is considered that the probability that the software adjustment processing task will be determined to be impossible will be lower than the probability that the hardware adjustment processing task will be determined to be impossible. In other words, it is considered that the probability that the hardware adjustment processing task will be determined to be impossible is greater than the probability the software adjustment processing task will be determined to be impossible.

For example, regarding the adjustment processing task for the communication device 170, the adjustment processing task for the processor 110, and the adjustment processing task for the storage device 160, which correspond to the first hardware adjustment processing task, a determination of whether each adjustment processing task is executable, may be executed in descending order of probability that the execution of each adjustment processing task is impossible. For example, in the adjustment processing task for the communication device 170, it is difficult to accurately predict the effect on other processing in the terminal device 100, and the effect of changing processing in the communication device 170 on other processing is greater than those of other first hardware adjustment processing tasks. Accordingly, it is considered that the probability that the adjustment processing task for the communication device 170 will be determined to be impossible is greater than the probability that each of the adjustment processing task for the processor 110 and the adjustment processing task for the storage device 160 will be determined to be impossible. Other processing includes, for example, processing related to an application program PRap other than the application program PRap10 that is a target for the QoS control. In addition, for example, in the adjustment processing task for the processor 110, it is difficult to accurately predict the effects on other processing in the terminal device 100; accordingly, it is considered that the probability that the adjustment processing task for the processor 110 will be determined to be impossible is greater than the probability that the adjustment processing task for the storage device 160 will be determined to be impossible.

In other words, in the example shown in FIG. 5, it is assumed that the descending order of probability of being determined to be impossible is the sequence: the network adjustment processing task; the adjustment processing task for the communication device 170; the adjustment processing task for the processor 110; and the first software adjustment processing task. Accordingly, in the operation shown in FIG. 5, the determination of whether the network adjustment processing task, the adjustment processing task for the communication device 170, the adjustment processing task for the processor 110, and the first software adjustment processing task are executable, is executed in descending order of probability of being determined to be impossible. Thus, in this embodiment, it is possible to efficiently execute processing related to the request for the QoS control. For example, when the network adjustment processing task is not executable (when the result of the determination of S120c is negative), the requester 140 determines not to request the execution of the QoS control, and the requester 140 terminates the processing related to the request for the QoS control without executing the processing from step S120c.

The operation of the network system 10 is not limited to the example shown in FIG. 5. For example, without going through the controller 120, the requester 140 may provide the communication device 170 with an inquiry as to whether the adjustment processing task for the communication device 170 is executable and a request for the execution of the adjustment processing task for the communication device 170. Similarly, without going through the controller 120, the requester 140 may provide the storage device 160 with an inquiry as to whether the adjustment processing task for the storage device 160 is executable and a request for the execution of the adjustment processing task for the storage device 160.

In addition, for example, an inquiry as to whether the second processing task (in the example shown in FIG. 5, the adjustment processing task for the communication device 270, the adjustment processing task for the processor 210, and the second software adjustment processing task) is executable may be executed. In this case, it is possible for the terminal device 100 to confirm executable processing included in the second processing task.

In addition, for example, a request for processing of the QoS control may be realized by an application programming interface (API) call for the processing, instead of transmitting a processing request, such as the start request REQsq and the termination request REQeq. Specifically, a request for the start of the QoS control may be an API call for the start of the QoS control executed by the requester 140 for the quality controller 302. In addition, a request for the termination of the QoS control may be an API call for the termination of the QoS control executed by the requester 140 for the quality controller 302. Similarly, each inquiry may be realized by an API call for the inquiry, instead of transmitting inquiry information such as the inquiry information Inet.

In this embodiment, transmission of the processing request and the API call for processing may be referred to as transmitting a processing request, without distinction therebetween. Similarly, transmission of the inquiry information and the API call for inquiry may be referred to as transmitting inquiry information, without distinction therebetween.

Figure 6:
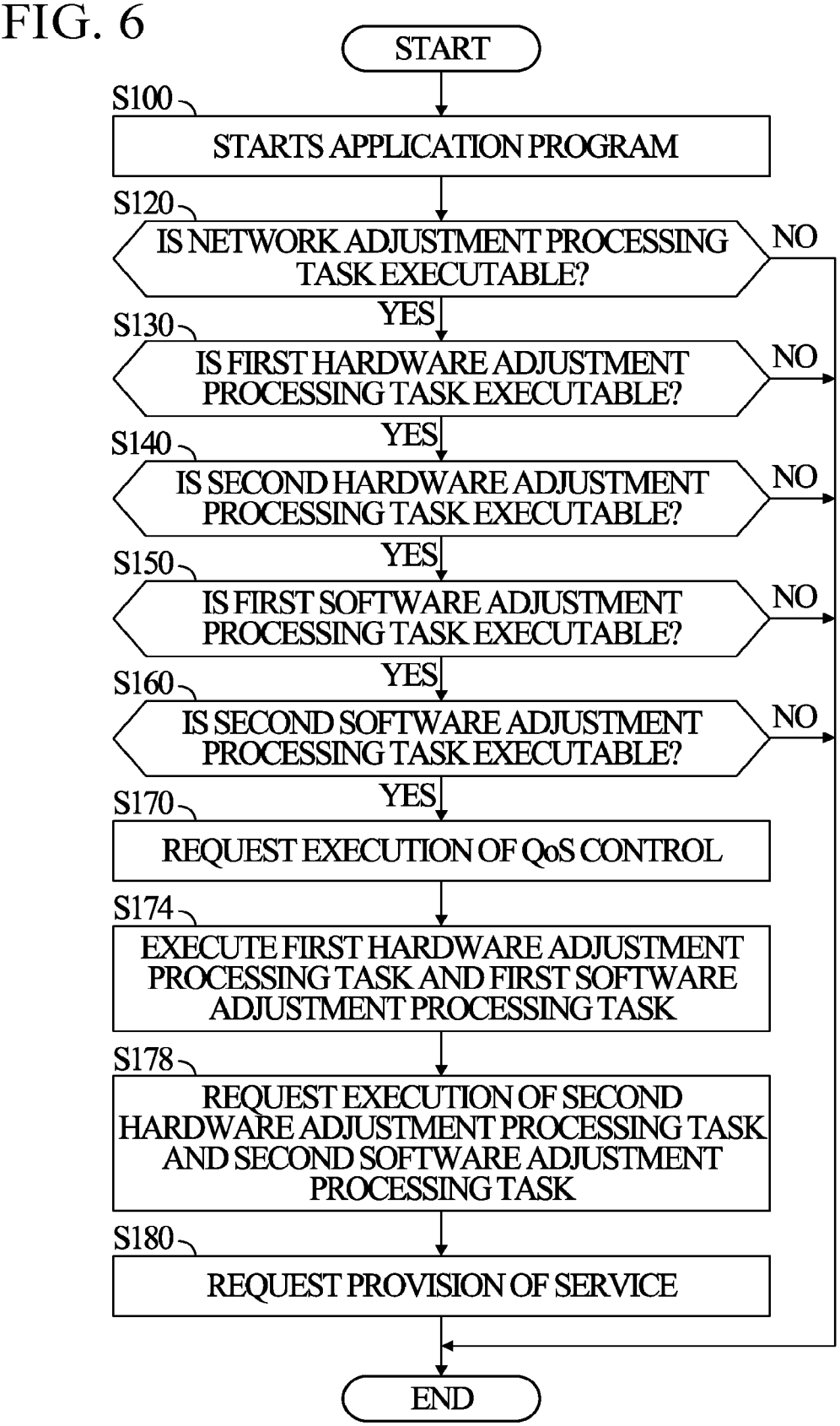
FIG. 6 is a flowchart showing an example of an operation of a terminal device shown in FIG. 1.

FIG. 6 is a flowchart showing an example of an operation of the terminal device 100 shown in FIG. 1. FIG. 6 shows an example of processing related to a request for the QoS control in the communication between the terminal device 100 and the server apparatus 200. A detailed description of the operation, which has been described with reference to FIG. 5, is omitted.

First, in step S100, the terminal device 100 starts the application program PRap10, which is to be used to use the predetermined service.

Next, in step S120, the requester 140 of the terminal device 100 determines whether the network adjustment processing task is executable. When multiple adjustment processing tasks each correspond to the network adjustment processing task, the requester 140 determines whether each of the multiple adjustment processing tasks, which corresponds to the network adjustment processing task, is executable, as in the first hardware adjustment processing task described in FIG. 5. In this case, when at least one of the multiple adjustment processing tasks corresponding to the network adjustment processing task is not executable, the network adjustment processing task is determined to not be executable. In addition, the determination of whether the multiple adjustment processing tasks corresponding to the network adjustment processing task are each executable may be executed in descending order of probability of each of the adjustment processing tasks being determined to be impossible.

When the result of the determination in step S120 is negative, the requester 140 terminates the processing related to the request for the QoS control without requesting the QoS control. On the other hand, when the result of the determination in step S120 is affirmative, the requester 140 progresses processing to step S130.

In step S130, the requester 140 of the terminal device 100 determines whether the first hardware adjustment processing task is executable. When multiple adjustment processing tasks each correspond to the first hardware adjustment processing task, the requester 140 determines whether each of the multiple adjustment processing tasks, which corresponds to the first hardware adjustment processing task, is executable, as in FIG. 5. In this case, when at least one of the multiple adjustment processing tasks corresponding to the first hardware adjustment processing task is not executable, the first hardware adjustment processing task is determined to not be executable.

When the result of the determination in step S130 is negative, the requester 140 terminates the processing related to the request for the QoS control without requesting the QoS control. On the other hand, when the result of the determination in step S130 is affirmative, the requester 140 progresses processing to step S140.

In step S140, the requester 140 of the terminal device 100 determines whether the second hardware adjustment processing task is executable. An operation for the determination of whether the second hardware adjustment processing task is executable is similar to the operation for the determination of whether the first hardware adjustment processing task is executable, except that, for example, an inquiry as to whether the second hardware adjustment processing task is executable is provided for the controller 220 of the server apparatus 200. For example, the requester 140 of the terminal device 100 transmits inquiry information to the controller 220 of the server apparatus 200 to inquire whether the second hardware adjustment processing task is executable. Then, the requester 140 of the terminal device 100 acquires reply information, which indicates the result of a confirmation of whether the second hardware adjustment processing task is executable, from the controller 220 of the server apparatus 200, and the requester 140 determines, based on the reply information acquired from the controller 220, whether the second hardware adjustment processing task is executable.

When multiple adjustment processing tasks each correspond to the second hardware adjustment processing task, the requester 140 determines whether each of the multiple adjustment processing tasks, which corresponds to the second hardware adjustment processing task, is executable, as in the first hardware adjustment processing task described in FIG. 5. In this case, when at least one of the multiple adjustment processing tasks corresponding to the second hardware adjustment processing task is not executable, the second hardware adjustment processing task is determined to not be executable. In addition, the determination of whether the multiple adjustment processing tasks corresponding to the second hardware adjustment processing task are executable may be executed in descending order of probability of being determined to be impossible.

When the result of the determination in step S140 is negative, the requester 140 terminates the processing related to the request for the QoS control without requesting the QoS control. On the other hand, when the result of the determination in step S140 is affirmative, the requester 140 progresses processing to step S150.

In step S150, the requester 140 of the terminal device 100 determines whether the first software adjustment processing task is executable. When multiple adjustment processing tasks each correspond to the first software adjustment processing task, the requester 140 determines whether each of the multiple adjustment processing tasks, which corresponds to the first software adjustment processing task, is executable, as in the first hardware adjustment processing task in FIG. 5. In this case, when at least one of the multiple adjustment processing tasks corresponding to the first software adjustment processing task is not executable, the first software adjustment processing task is determined to not be executable. In addition, the determination of whether the multiple adjustment processing tasks corresponding to the first software adjustment processing task are executable may be executed in descending order of probability of being determined to be impossible.

When the result of the determination in step S150 is negative, the requester 140 terminates the processing related to the request for the QoS control without requesting the QoS control. On the other hand, when the result of the determination in step S150 is affirmative, the requester 140 progresses processing to step S160.

In step S160, the requester 140 of the terminal device 100 determines whether the second software adjustment processing task is executable. An operation for the determination of whether the second software adjustment processing task is executable is similar to the operation for the determination of whether the first software adjustment processing task is executable, except that, for example, an inquiry as to whether the second software adjustment processing task is executable is provided for the controller 220 of the server apparatus 200. For example, the requester 140 of the terminal device 100 transmits inquiry information to the controller 220 of the server apparatus 200 to inquire whether the second software adjustment processing task is executable. Then, the requester 140 of the terminal device 100 acquires reply information, which indicates the result of a confirmation of whether the second software adjustment processing task is executable, from the controller 220 of the server apparatus 200, and the requester 140 determines, based on the reply information acquired from the controller 220, whether the second software adjustment processing task is executable.

When multiple adjustment processing tasks each correspond to the second software adjustment processing task, the requester 140 determines whether each of the multiple adjustment processing tasks, which corresponds to the second software adjustment processing task, is executable, as in the first hardware adjustment processing task in FIG. 5. In this case, when at least one of the multiple adjustment processing tasks corresponding to the second software adjustment processing task is not executable, the second software adjustment processing task is determined to not be executable. In addition, the determination of whether the multiple adjustment processing tasks corresponding to the second software adjustment processing task are executable may be executed in descending order of probability of being determined to be impossible.

When the result of the determination in step S160 is negative, the requester 140 terminates the processing related to the request for the QoS control without requesting the QoS control. On the other hand, when the result of the determination in step S160 is affirmative, the requester 140 progresses processing to step S170.

In step S170, the requester 140 of the terminal device 100 requests the quality controller 302 to execute the QoS control. For example, the requester 140 transmits a start request REQsq to the quality controller 302 to request the start of the QoS control.

Next, in step S174, the controller 120 of the terminal device 100 executes the first hardware adjustment processing task and the first software adjustment processing task.

Next, in step S178, the requester 140 of the terminal device 100 requests that the server apparatus 200 execute the second hardware adjustment processing task and the second software adjustment processing task. For example, the requester 140 transmits an adjustment request REQaj2 to the server apparatus 200 to request the execution of the second hardware adjustment processing task and the execution of the second software adjustment processing task. Thus, for example, the controller 220 of the server apparatus 200 executes the second hardware adjustment processing task and the second software adjustment processing task.

Then, in step S180, the requester 140 of the terminal device 100 requests the server apparatus 200 to provide the predetermined service. For example, the requester 140 transmits a service request REQssv to the server apparatus 200 to request the start of the predetermined service. Thus, for example, the service provider 230 of the server apparatus 200 provides the predetermined service for the terminal device 100.

Thus, in the operation shown in FIG. 6, the determination for the network adjustment processing task (step S120) is executed before the determination for other adjustment processing tasks (step S130, etc.). In addition, the probability that the execution of the network adjustment processing task will be determined to be impossible is considered to be greater than the probability that the execution of each of the hardware adjustment processing task and the software adjustment processing task will be determined to be impossible. Furthermore, in the operation shown in FIG. 6, the determination for the hardware adjustment processing task (steps S130 and S140) is executed before the determination for the software adjustment processing task (steps S150 and S160). In addition, the probability that the execution of the hardware adjustment processing task will be determined to be impossible is greater than the probability that the execution of the software adjustment processing task will be determined to be impossible. Then, the requester 140 of the terminal device 100 determines not to request the execution of the QoS control without determining whether one or more undetermined adjustment processing tasks among the plurality of adjustment processing tasks are executable in response to determining that one of the plurality of adjustment processing tasks is not executable. Thus, in this embodiment, it is possible to efficiently execute processing related to the request for the QoS control.

The operation of the terminal device 100 (the processing related to the request for the QoS control) is not limited to the example shown in FIG. 6. For example, the order of determinations in steps S130, S140, S150, and S160 may differ from the order shown in FIG. 6 as long as the determination in step S130 is executed before the determination in step S150 in a situation in which the determination in step S140 is executed before the determination in step S160.

In addition, for example, each of the network adjustment processing task, the first hardware adjustment processing task, the first software adjustment processing task, the second hardware adjustment processing task, and the second software adjustment processing task may include at least one of the first and the second processing tasks.

When the second processing task is included in at least one of the network adjustment processing task, the first hardware adjustment processing task, the first software adjustment processing task, the second hardware adjustment processing task, and the second software adjustment processing task, the requester 140 may request the QoS control based on a condition being satisfied in which the second processing task is executable, for example. In other words, the requester 140 may determine to request the execution of the QoS control when the first processing task and the second processing task are executable, whereas the requester 140 may determine not to request the execution of the QoS control when at least one of the first processing task and the second processing task is not executable. In this case, the determination of whether one or more processing tasks not corresponding to either the first processing task or the second processing task among the plurality of adjustment processing tasks are executable may not be executed.

In addition, the operation of the terminal device 100 may be similar to the operation shown in FIG. 6 when the QoS control is requested on the condition that each of the plurality of adjustment processing tasks corresponds to the first processing task or the second processing task in a situation in which the first processing task and the second processing task are executable. Alternatively, the requester 140 may determine whether the second processing task, which is included in one of the tasks consisting of: the network adjustment processing task; the first hardware adjustment processing task; the first software adjustment processing task; the second hardware adjustment processing task; and the second software adjustment processing task, is executable after step S160 and before step S170. In other words, the requester 140 may determine whether the first processing task is executable before determining whether the second processing task is executable, and the requester 140 may determine not to request the execution of the QoS control without determining whether the second processing task is executable when the first processing task is not executable.

When one or more processing tasks other than the first processing task (for example, the second processing task, etc.) are included in one of the network adjustment processing task, the first hardware adjustment processing task, the first software adjustment processing task, the second hardware adjustment processing task, and the second software adjustment processing task, the determination of whether the one or more processing tasks other than the first processing task are executable may not be executed. Specifically when the one or more processing tasks other than the first processing task is included in a plurality of adjustment processing tasks corresponding to the network adjustment processing task, the requester 140 may not execute the determination of whether the one or more processing tasks other than the first processing task are executable in step S120, for example. When all of the network adjustment processing tasks is a processing task other than the first processing task, the determination in step S120 may not be executed. When the one or more processing tasks other than the first processing task is included, the determination of whether the one or more processing tasks other than the first processing task are executable may not be executed in each of steps S130, S140, S150, and S160. In other words, when the first processing task is executable, the requester 140 may request the execution of the QoS control, the execution of the first processing task, the second processing task, etc., without determining whether one or more processing tasks other than the first processing task (for example, the second processing task, etc.) are executable. In this case, it is possible to omit the determination of whether one or more processing tasks other than the first processing task are executable; accordingly, it is possible to efficiently execute processing related to the request for the QoS control.

In a configuration in which, when the first processing task is executable, the QoS control is requested regardless of whether the second processing task is executable, the determination of whether the second processing task is executable may be executed. In this case, the requester 140 may determine whether the second processing task, which is included in one of the network adjustment processing task, the first hardware adjustment processing task, the first software adjustment processing task, the second hardware adjustment processing task, and the second software adjustment processing task, is executable after step S160 and before step S170. In this case, it is possible for the terminal device 100 to confirm executable processing included in the second processing task.

In this embodiment, the network system 10 includes the network 300 in which the quality of communication is controlled, the terminal device 100 connected to the network 300, and the server apparatus 200 configured to provide a service for the terminal device 100 via the network 300. For example, the terminal device 100 includes the communication device 170 configured to communicate with the server apparatus 200 connected to the network 300, and the requester 140 configured to request the execution of the QoS control. When the server apparatus 200 provides the terminal device 100 with the service, the requester 140 requests the execution of the QoS control, which is control of the quality of communication between the terminal device 100 and the server apparatus 200, based on a condition being satisfied, the condition being a condition in which one, some, or all of the plurality of adjustment processing tasks are executable. The adjustment processing tasks are each a processing task to adjust at least one of a resource for provision of the service and a resource for use of the service.

Thus, in this embodiment, the execution of the QoS control is requested when at least one of the resource for the provision of the service and the resource for the use of the service is allocated so that the terminal device 100 can fully use the service provided by the server apparatus 200. In other words, the execution of the QoS control is not requested when at least one of the resource for the provision of the service and the resource for the use of the service is allocated so that the terminal device 100 cannot fully use the service provided by the server apparatus 200. Accordingly, in this embodiment, it is possible to execute the QoS control in the communication between the terminal device 100 and the server apparatus 200 effectively. In other words, in this embodiment, it is possible to prevent a decrease in the effect of the QoS control on the communication between the terminal device 100 and the server apparatus 200.

In one aspect (first aspect) according to this embodiment, the requester 140 may determine whether the first processing task to allocate resources required for the use of the service is executable before determining whether the second processing task to allocate resources recommended for the use of the service is executable. When the first processing task is not executable, the requester 140 may determine not to request the execution of the QoS control without first determining whether the second processing task is executable. In the first aspect, it is possible to omit the determination of whether the second processing task is executable; accordingly, it is possible to efficiently execute processing related to the request for the QoS control.

In addition, in the first aspect, when the first processing task is executable, the requester 140 may request the execution of the QoS control, the execution of the first processing task, and the execution of the second processing task without determining whether the second processing task is executable. In this case, it is possible to omit the determination of whether the second processing task is executable; accordingly, it is possible to efficiently execute processing related to the request for the QoS control.

In another aspect (second aspect) according to this embodiment, the requester 140 may request the execution of the QoS control when the first processing task to allocate resources required for the use of the service and the second processing task to allocate resources recommended for the use of the service are executable. In addition, the requester 140 may determine not to request the execution of the QoS control when at least one of the first processing task and the second processing task is not executable. In the second aspect, when the resources recommended for the use of the service cannot be allocated in a situation in which the resources required for the use of the service can be allocated, the execution of the QoS control is not requested. In other words, in the second aspect, the execution of the QoS control is requested when the terminal device 100 can use the service of standard quality or the service of the highest quality, for example. Accordingly, in the second aspect, it is possible to execute the QoS control effectively compared to a configuration in which the execution of the QoS control is requested even when the resources recommended for the use of the service cannot be allocated. In other words, in the second aspect, it is possible to prevent a decrease in the effect of the QoS control.

In the first aspect and the second aspect, the plurality of adjustment processing tasks may include the network adjustment processing task to adjust the resources of the network 300, the hardware adjustment processing task to adjust the hardware resources of at least one of the terminal device 100 and the server apparatus 200, and the software adjustment processing task. The software adjustment processing task is a processing task for software executed by at least one of the terminal device 100 and the server apparatus 200. The network adjustment processing task includes at least one of the first processing task and the second processing task, the hardware adjustment processing task includes at least one of the first processing task and the second processing task, and the software adjustment processing task includes at least one of the first processing task and the second processing task. Even in this case, it is possible to obtain effects similar to those in the aspect described above.

In yet another aspect (third aspect) according to this embodiment, the plurality of adjustment processing tasks may include the network adjustment processing task to adjust the resources of the network 300, the hardware adjustment processing task to adjust the hardware resources of at least one of the terminal device 100 and the server apparatus 200, and the software adjustment processing task. The software adjustment processing task is a processing task for software executed by at least one of the terminal device 100 and the server apparatus 200. The requester 140 may determine whether the network adjustment processing task, the hardware adjustment processing task, and the software adjustment processing task are executable in the sequence: the network adjustment processing task; the hardware adjustment processing task; and the software adjustment processing task. When all of the network adjustment processing task, the hardware adjustment processing task, and the software adjustment processing task are executable, the requester 140 may request the execution of the QoS control. The requester 140 may determine not to request the execution of the QoS control when at least one of the network adjustment processing task, the hardware adjustment processing task, and the software adjustment processing task is not executable.

Thus, in the third aspect, the determination for the network adjustment processing task, the determination for the hardware adjustment processing task, and the determination for the software adjustment processing task are executed in predetermined sequence, and when at least one of the network adjustment processing task, the hardware adjustment processing task, and the software adjustment processing task is not executable, the QoS control is not requested. Accordingly, in the third aspect, it is possible to efficiently execute processing related to the request for the QoS control. In addition, when the predetermined sequence is, for example, in descending order of probability of each of the adjustment processing tasks being determined to be impossible, it is possible to more efficiently execute processing related to the request for the QoS control.

In yet another aspect (fourth aspect) according this embodiment, the plurality of adjustment processing tasks may include the network adjustment processing task to adjust the resources of the network 300, the first hardware adjustment processing task, the first software adjustment processing task, the second hardware adjustment processing task, and the second software adjustment processing task. The first hardware adjustment processing task is a processing task to adjust the hardware resources of the terminal device 100, and the first software adjustment processing task is a processing task for the software executed by the terminal device 100. The second hardware adjustment processing task is a processing task to adjust the hardware resources of the server apparatus 200, and the second software adjustment processing task is a processing task for the software executed by the server apparatus 200.

When all of the network adjustment processing task, the first hardware adjustment processing task, the first software adjustment processing task, the second hardware adjustment processing task, and the second software adjustment processing task are executable, the requester 140 may request the execution of the QoS control. In addition, when at least one of the network adjustment processing task, the first hardware adjustment processing task, the first software adjustment processing task, the second hardware adjustment processing task, and the second software adjustment processing task is not executable, the requester 140 may determine not to request the execution of the quality control. Among the network adjustment processing task, the first hardware adjustment processing task, the first software adjustment processing task, the second hardware adjustment processing task, and the second software adjustment processing task, the determination of whether the network adjustment processing task is executable is executed first. The determination of whether the first hardware adjustment processing task is executable is executed before the determination of whether the first software adjustment processing task is executable, and the determination of whether the second hardware adjustment processing task is executable is executed before the determination of whether the second software adjustment processing task is executable.

Thus, in the fourth aspect the determination for the network adjustment processing task, the determination for the first hardware adjustment processing task, the determination for the first software adjustment processing task, the determination for the second hardware adjustment processing task, and the determination for the second software adjustment processing task are executed in predetermined sequence. When at least one of the network adjustment processing task, the first hardware adjustment processing task, the first software adjustment processing task, the second hardware adjustment processing task, and the second software adjustment processing task is not executable, the QoS control is not requested. Accordingly, in the fourth aspect, it is possible to efficiently execute processing related to the request for the QoS control. In addition, when the predetermined sequence is, for example, in descending order of probability, in which each of the adjustment processing tasks is determined to be impossible, it is possible to more efficiently execute processing related to the request for the QoS control.

In the third aspect and the fourth aspect, the requester 140 may determine not to request the execution of the QoS control without determining whether one or more undetermined adjustment processing tasks among the plurality of adjustment processing tasks are executable in response to determining that one of the plurality of adjustment processing tasks is not executable. In this case, it is possible to omit the determination of whether the one or more undetermined adjustment processing tasks are executable; accordingly, it is possible to efficiently execute processing related to the request for the QoS control.

2. Modifications

The invention is not limited to the embodiment described above. Specific modifications will be explained below. Two or more modifications freely selected from the following modifications may be combined.

First Modification

In the embodiment described above, examples are indicated in which the terminal device 100 requests the quality controller 302 to execute the QoS control; however, the present invention is not limited to these examples. For example, the server apparatus 200 may request the quality controller 302 to execute the QoS control. In this case, the requester 140 of the terminal device 100 may not include a function related to the request of the QoS control.

Figure 7:
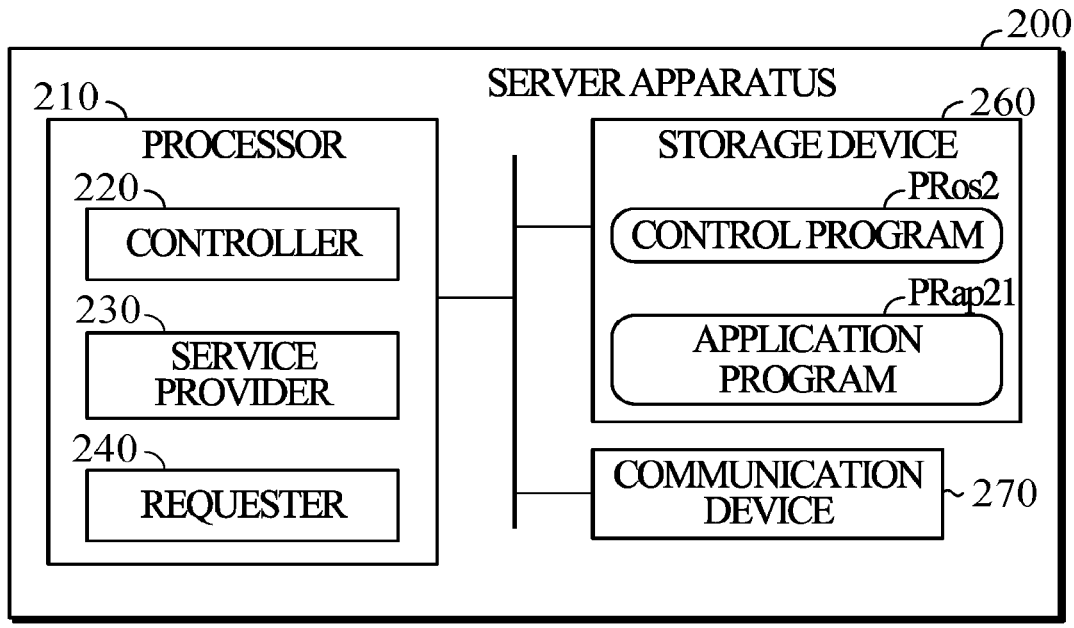
FIG. 7 is a block diagram showing a configuration of a server apparatus according to a first modification.

FIG. 7 is a block diagram showing a configuration of the server apparatus 200 according to a first modification. Elements substantially the same as the elements described with reference to FIG. 1 to FIG. 6 are denoted with like reference signs, and detailed explanations thereof are omitted. The server apparatus 200 shown in FIG. 7 is similar to the server apparatus 200 shown in FIG. 1. For example, the server apparatus 200 is realized by a computer system including the processor 210, the storage device 260, and the communication device 270. However, the server apparatus 200 shown in FIG. 7 differs from the server apparatus 200 shown in FIG. 1 in that the processor 210 executes an application program PRap21 instead of the application program PRap20. Thus, the storage device 260 stores the application program PRap21 instead of the application program PRap20. The application program PRap21 may be transmitted from another device. The server apparatus 200 shown in FIG. 7 is an example of the "information processing apparatus." In this case, the communication device 270 is an example of the "communicator." The terminal device 100 is an example of the "different information processing apparatus."

The processor 210 functions as the controller 220 by executing the control program PRos2 read from the storage device 260. In addition, the processor 210 functions as the service provider 230 and a requester 240 by executing the application program PRap21 read from the storage device 260, for example. The controller 220 and the service provider 230 are similar to the controller 220 and the service provider 230 shown in FIG. 1, respectively. The requester 240 is similar to the requester 140 of the terminal device 100 shown in FIG. 1.

For example, when the server apparatus 200 provides the terminal device 100 with the predetermined service, the requester 240 requests the execution of the QoS control, which is control of the quality of communication between the terminal device 100 and the server apparatus 200, based on a condition being satisfied, the condition being a condition in which one, some, or all of the plurality of adjustment processing tasks are executable. As in the embodiment described above, the adjustment processing tasks are each a processing task to adjust at least one of a resource for provision of the service and a resource for use of the predetermined service.

In the first modification, the requester 240 may execute operations similar to those of the requester 140 described in each of the first aspect to the fourth aspect that are described above. In the first modification, it is possible to obtain effects similar to those in the embodiment described above.

Second Modification

In the embodiment and the first modification that are described above, examples are described in which the determination of whether one, some, or all of the plurality of adjustment processing tasks are executable is executed by the requester 140 of the terminal device 100 or by the requester 240 of the server apparatus 200; however, the present invention is not limited to these examples. For example, the quality controller 302 may determine whether one, some, or all of the plurality of adjustment processing tasks are executable. In this case, the requester 140 or 240 may not include a function of determining whether one, some, or all of the plurality of adjustment processing tasks are executable.

Figure 8:
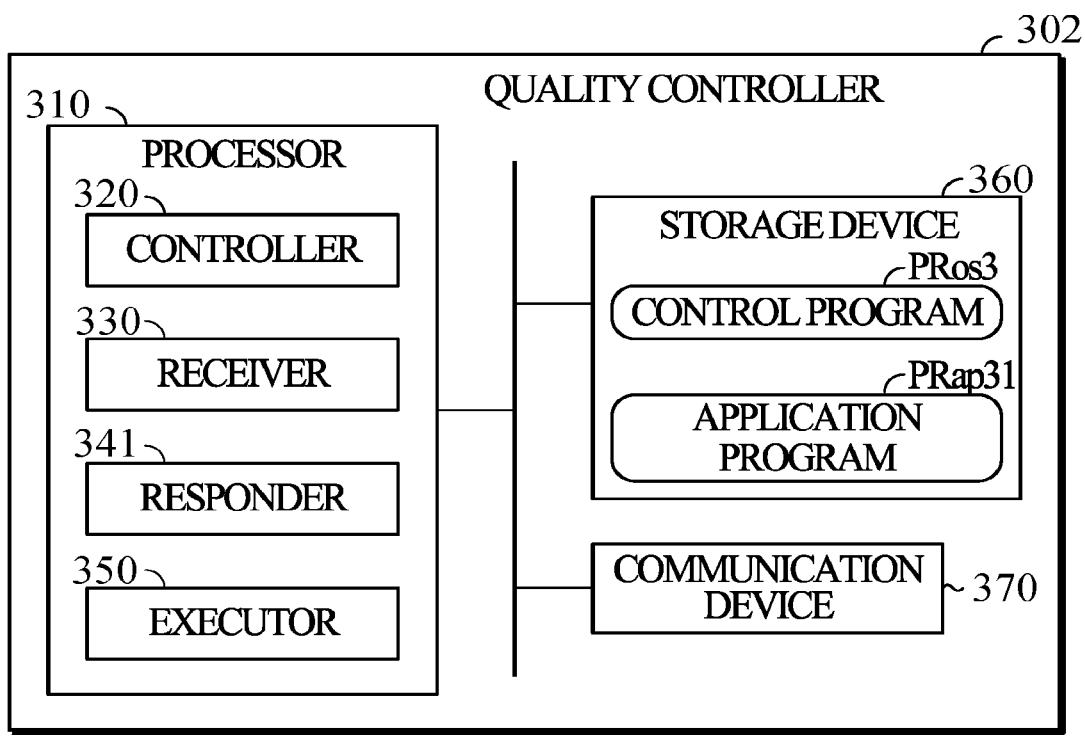
FIG. 8 is a block diagram showing a configuration of a quality controller according to a second modification.

FIG. 8 is a block diagram showing a configuration of the quality controller 302 according to a second modification. Elements substantially the same as the elements described with reference to FIG. 1 to FIG. 7 are denoted with like reference signs, and detailed explanations thereof are omitted. The quality controller 302 shown in FIG. 8 is similar to the quality controller 302 shown in FIG. 2. For example, the quality controller 302 is realized by a computer system including the processor 310, the storage device 360, and the communication device 370. However, the quality controller 302 shown in FIG. 8 differs from the quality controller 302 shown in FIG. 2 in that the processor 310 executes an application program PRap31 instead of the application program PRap30. Thus, the storage device 360 stores the application program PRap31 instead of the application program PRap30. The application program PRap31 may be transmitted from another device. The quality controller 302 shown in FIG. 8 is an example of a "quality control system." In the second modification, the terminal device 100 is an example of a "first information processing apparatus" and the server apparatus 200 is an example of a "second information processing apparatus."

The processor 310 functions as the controller 320 by executing the control program PRos3 read from the storage device 360. In addition, the processor 310 functions as the receiver 330, a responder 341, the executor 350, etc., by executing the application program PRap31 read from the storage device 360, for example. The controller 320, the receiver 330, and the executor 350 are similar to the controller 320, the receiver 330, and the executor 350 that are shown in FIG. 2, respectively. In addition, the responder 341 is similar to the responder 340 shown in FIG. 2 except for accepting a start request REQsq received by the receiver 330 based on a condition being satisfied in which one, some, or all of the plurality of adjustment processing tasks are executable. The start request REQsq is an example of an "execution request."

For example, when one, some, or all of the plurality of adjustment processing tasks are executable, the responder 341 accepts the start request REQsq received by the receiver 330, the plurality of adjustment processing tasks being processing tasks to adjust at least one of a resource, which is to be used for provision of the predetermined service between the terminal device 100 and the server apparatus 200, and a resource, which is to be used for use of the predetermined service between the terminal device 100 and the server apparatus 200. In this case, the responder 341 transmits an acknowledgement response ACKsq to the source of the start request REQsq (the terminal device 100 or the server apparatus 200, etc.) as a response to the start request REQsq. In the second modification, the request for the QoS control may be made by the terminal device 100, or alternatively, the request for the QoS control may be made by a server, such as the server apparatus 200. Alternatively, the request for the QoS control may be made by a device included in the network 300 (not shown; different from the quality controller 302).

In the second modification, the responder 341 may execute the determination of whether one, some, or all of the plurality of adjustment processing tasks are executable, etc., in the same manner as the requester 140 described in each of the first aspect to the fourth aspect that are described above. In the second modification, it is possible to obtain effects similar to those in the embodiment and in the first modification that are described above.

Third Modification

In the embodiment, the first modification, and the second modification that are described above, examples are indicated in which, among the network adjustment processing task, the hardware adjustment processing task, and the software adjustment processing task, the determination for the network adjustment processing task is executed first; however, the present invention is not limited to these examples. For example, depending on the predetermined service, the determination for either the hardware adjustment processing task or the software adjustment processing task may be executed before the determination for the network adjustment processing task. Specifically, in shooting games, etc., it is considered that a fair game will not be achieved if the image quality is poor. Accordingly, when the predetermined service is a game, etc., requiring high image quality, the requester 140 may execute the determination for the adjustment processing task for the processor 110 in the hardware adjustment processing task before the determination for the network adjustment processing task. In the third modification, it is possible to obtain effects similar to those in the embodiment, in the first modification, and in the second modification that are described above.

Fourth Modification

In the embodiment, the first modification, the second modification, and the third modification that are described above, no example is particularly described in which the terminal device 100 is capable of being connected to multiple networks 300 managed by multiple carriers; however, the terminal device 100 may be capable of being connected to multiple networks 300. In this case, the plurality of adjustment processing tasks may include a processing task to select a network 300 to be connected to the terminal device 100 from the multiple networks 300, etc. For example, the network adjustment processing task may include a processing task to select a network 300, which includes a base station closest to the terminal device 100, as a network 300 to be connected to the terminal device 100. In the third modification, it is possible to obtain effects similar to those in the embodiment, in the first modification, in the second modification, and in the third modification that are described above.

3. Other Matters (1) In the foregoing embodiments, the storage device (such as the storage devices 160, 260, and 360) is a recording medium readable by the processor (such as the processors 110, 210, and 310), such as ROM and RANI; however, the storage device may be flexible disks, magneto-optical disks (e.g., compact disks, digital multi-purpose disks, Blu-ray (registered trademark) discs, smart-cards, flash memory devices (e.g., cards, sticks, key drives), Compact Disc-ROMs (CD-ROMs), registers, removable discs, hard disks, floppy (registered trademark) disks, magnetic strips, databases, servers, or other suitable storage mediums. The program may be transmitted from a network via telecommunication lines. Alternatively, the program may be transmitted from a communication network via telecommunication lines.

(2) The foregoing embodiments may be applicable to at least one of systems using Long Term Evolution (LTE), LTE-advanced (LTE-A), SUPER 3G, IMT-Advanced, 4th generation mobile communication system (4G), 5th generation mobile communication system (5G), future radio access (FRA), new Radio (NR), W-CDMA (registered trademark), GSM (registered trademark), CDMA2000, Ultra Mobile Broadband (UMB), IEEE 802.11 [Wi-Fi (registered trademark)], IEEE 802.16 [WiMAX (registered trademark)], IEEE 802.20, Ultra-wideband (UWB), Bluetooth (registered trademark), and other appropriate systems, and next-generation systems extended based on the system. In addition, the embodiments described above may be applicable to a combination of multiple systems (for example, a combination of 5G with at least one of LTE and LTE-A, etc.).

(3) In the foregoing embodiments, information, signals and the like may be presented by use of various techniques. For example, data, instructions, commands, information, signals, bits, symbols, chips, and the like may be presented by freely selected combination of voltages, currents, electromagnetic waves, magnetic fields or magnetic particles, light fields or photons.

(4) In the foregoing embodiments, the input and output of information, or the input or output of information, etc., may be stored in a specific location (e.g., memory) or may be managed by use of a management table. The information, etc., that is the input and output, or the input or the output, may be overwritten, updated, or appended. The information, etc., that is output may be deleted. The information, etc., that is input may be transmitted to other devices.

(5) In the foregoing embodiments, determination may be made by values that can be represented by one bit (0 or 1), may be made in Boolean values (true or false), or may be made by comparing numerical values (for example, comparison with a predetermined value).

(6) The order of processes, sequences, flowcharts, etc., that have been used to describe the embodiments may be changed as long as they do not conflict. For example, although a variety of methods has been illustrated in this disclosure with a variety of elements of steps in exemplary orders, the specific orders presented herein are by no means limiting.

(7) Each of functions shown in drawings such as FIG. 1 is realized by freely selected combination of at least one of hardware and software. The method for realizing each functional block is not limited thereto. That is, each functional block may be implemented by one piece of device that is physically or logically aggregated. Alternatively, each functional block may be realized by directly or indirectly connecting two or more physically and logically separate, or physically or logically separate, pieces of device (by using cables and radio, or cables, or radio, for example), and using these devices. The functional block may be realized by combining the software with one device described above or two or more of these devices.

The communication devices (for example, the communication devices 170, 270, and 370) are each hardware (a transmitting and receiving device) for communicating between computers via at least one of a wired network and a wireless network. The communication devices 170 and 270 are each referred to as, for example, a network device, a network controller, a network card, or a communication module. The communication device 170 may include a high-frequency switch, duplexers, filters, or frequency synthesizers to realize Frequency Division Duplexing (FDD) and Time Division Duplexing (TDD), or FDD, or TDD, for example.

(8) In the foregoing embodiments, programs, whether referred to as software, firmware, middleware, microcode, hardware description language, or by any other name, are instructions, instruction sets, code, code segments, or program code. It should be interpreted broadly to mean programs, subprograms, software modules, applications, software applications, software packages, routines, subroutines, objects, executable files, execution threads, procedures, functions, etc.

Software, instructions, etc., may be transmitted and received via communication media. For example, when software is transmitted from a website, a server, or other remote sources, by using wired technologies such as coaxial cables, optical fiber cables, twisted-pair cables, and digital subscriber lines (DSL), and wireless technologies such as infrared radiation and radio and microwaves by using wired technologies, or by wireless technologies, these wired technologies and wireless technologies, wired technologies, or wireless technologies, are also included in the definition of communication media.

(9) In each embodiment described above, the terms "system" and "network" are used interchangeably.

(10) The information and parameters described in this disclosure may be represented by absolute values, may be represented by relative values with respect to predetermined values, or may be represented by using other pieces of applicable information. For example, radio resources may be specified by predetermined indices. The names used for parameters in this specification are in no respect limiting. In addition, equations, etc., to use these parameters may be other than those explicitly disclosed in this specification. For example, since a variety of channels (for example, PUCCH, PDCCH, etc.) and information elements (for example, TPC) can be identified by any suitable names, a variety of names to assign to these various channels and information elements are in no respect limiting.

(11) In the foregoing embodiments, the terminal device 100 may be a mobile station (MS). A mobile station (mobile device) may be referred to, by one skilled in the art as a "subscriber station", a "mobile unit", a "subscriber unit", a "wireless unit", a "remote unit", a "mobile device", a "wireless device", a "wireless communication device", a "remote device", a "mobile subscriber station", an "access terminal", a "mobile terminal", a "wireless terminal", a "remote terminal", a "handset", a "user agent", a "mobile client", a "client", or some other suitable terms. The terms "mobile station", "user terminal", "user equipment (UE)", "terminal", and the like may be used interchangeably in the present disclosure.

(12) In the foregoing embodiments, the terms "connected" and "coupled", or any modification of these terms, may mean all direct or indirect connections or coupling between two or more elements, and may include the presence of one or more intermediate elements between two elements that are "connected" or "coupled" to each other. The coupling or connection between the elements may be physical, logical, or a combination of these. For example, "connection" may be replaced with "access." As used in this specification, two elements may be considered "connected" or "coupled" to each other by using one or more electrical wires, cables, and printed electrical connections, or by using one or more electrical wires, cables, or printed electrical connections. In addition, two elements may be considered "connected" or "coupled" to each other by using electromagnetic energy, etc., which is a non-limiting and non-inclusive example, having wavelengths in radio frequency regions, microwave regions, and optical (both visible and invisible) regions.

(13) In the foregoing embodiments, the phrase "based on" as used in this specification does not mean "based only on", unless specified otherwise. In other words, the phrase "based on" means both "based only on" and "based at least on."

(14) The term "determining" as used in this specification may encompass a wide variety of actions. For example, the term "determining" may be used when practically "determining" that some act of calculating, computing, processing, deriving, investigating, looking up (for example, looking up a table, a database, or some other data structure), ascertaining, etc., has taken place. Furthermore, "determining" may be used when practically "determining" that some act of receiving (for example, receiving information), transmitting (for example, transmitting information), inputting, outputting, accessing (for example, accessing data in a memory) etc., has taken place. Furthermore, "determining" may be used when practically "determining" that some act of receiving (for example, receiving information), transmitting (for example, transmitting information), inputting, outputting, accessing (for example, accessing data in a memory) and so forth has taken place. That is, "determining" may be used when practically determining to take some action. The term "determining" may be replaced with "assuming", "expecting", "considering", etc.

(15) As long as terms such as "include", "comprise", and modifications of these are used in the foregoing embodiments, these terms are intended to be inclusive, in a manner similar to the way the term "provide" is used. Furthermore, the term "or" as used in this specification or in claims is not intended to be an exclusive disjunction.

(16) In the present disclosure, when articles such as, for example, "a", "an", and "the" are added in the English translation, these articles may also indicate plural forms of words, unless the context clearly indicates otherwise.

(17) In this disclosure, the phrase "A and B are different" may mean "A and B are different from each other." The phrase "A and B are different from C, respectively" may mean that "A and B are different from C." Terms such as "separated" and "combined" may be interpreted in the same way as "different."

(18) The examples and embodiments illustrated in this specification may be used individually or in combination, which may be altered depending on the mode of implementation. A predetermined piece of information (for example, a report to the effect that something is "X") does not necessarily have to be indicated explicitly, and may be indicated in an implicit way (for example, by not reporting this predetermined piece of information, by reporting another piece of information, etc.).

Although the disclosure is described in detail, it should be obvious to one skilled in the art that the present invention is by no means limited to the embodiments described in this specification. The present disclosure can be implemented with a variety of corrections and in a variety of modifications, without departing from the spirit and scope of the present invention defined as in the recitations of the claims. Consequently, the description in this specification is provided only for the purpose of explaining examples and should by no means be construed to limit the present invention in any way.

DESCRIPTION OF REFERENCE SIGNS

10 . . . network system, 100 . . . terminal device, 110 . . . processor, 120 . . . controller, 140 . . . requester, 160 . . . storage device, 170 . . . communication device, 180 . . . input device, 190 . . . output device, 200 . . . server apparatus, 210 . . . processor, 220 . . . controller, 230 . . . service provider, 240 . . . requester, 260 . . . storage device, 270 . . . communication device, 300 . . . network, 302 . . . quality controller, 310 . . . processor, 320 . . . controller, 330 . . . receiver, 340, 341 . . . responder, 350 . . . executor, 360 . . . storage device, 370 . . . communication device.

The invention claimed is:

1. An information processing apparatus connected to a network in which quality of communication is controlled, the information processing apparatus comprising:
   processing circuitry configured to
   communicate with a different information processing apparatus connected to the network; and
   request, when the different information processing apparatus provides the information processing apparatus with a service, execution of quality control based on a condition being satisfied, the quality control being control of quality of communication with the different information processing apparatus, the condition being a condition in which a plurality of adjustment processing tasks are executable, and the plurality of adjustment processing tasks being processing tasks to adjust at least one of a resource for provision of the service and a resource for use of the service, wherein: the plurality of adjustment processing tasks includes:
   a network adjustment processing task to adjust resources of the network;
   a hardware adjustment processing task to adjust hardware resources of at least one of the information processing apparatus and the different information processing apparatus; and
   a software adjustment processing task that is a processing task for software executed by at least one of the information processing apparatus and the different information processing apparatus, and
   the processing circuitry is configured to:
   determine whether the network adjustment processing task, the hardware adjustment processing task, and the software adjustment processing task are executable in sequence: the network adjustment processing task; the hardware adjustment processing task; and the software adjustment processing task;
   request, when all of the network adjustment processing task, the hardware adjustment processing task, and the software adjustment processing task are executable, the quality control; and
   determine, when at least one of the network adjustment processing task, the hardware adjustment processing task, and the software adjustment processing task is not executable, not to request the execution of the quality control.

2. The information processing apparatus according to claim 1, wherein the processing circuitry is configured to determine, in response to determining that one of the plurality of adjustment processing tasks is not executable, not to request the execution of the quality control without determining whether one or more undetermined adjustment processing tasks among the plurality of adjustment processing tasks are executable.

3. The information processing apparatus according to claim 1,
   wherein the hardware adjustment processing task is a processing task to control an amount of free memory, and
   wherein the software adjustment processing task is a processing task to control a stop on an application program.

4. An information processing apparatus connected to a network in which quality of communication is controlled, the information processing apparatus comprising:
processing circuitry configured to
communicate with a different information processing apparatus connected to the network; and
request, when the different information processing apparatus provides the information processing apparatus with a service, execution of quality control based on a condition being satisfied, the quality control being control of quality of communication with the different information processing apparatus, the condition being a condition in which a plurality of adjustment processing tasks are executable, and the plurality of adjustment processing tasks being processing tasks to adjust at least one of a resource for provision of the service and a resource for use of the service, wherein: the plurality of adjustment processing tasks includes:
a network adjustment processing task to adjust resources of the network;
a first hardware adjustment processing task to adjust hardware resources of the information processing apparatus;
a first software adjustment processing task that is a processing task for software executed by the information processing apparatus;
a second hardware adjustment processing task to adjust hardware resources of the different information processing apparatus; and
a second software adjustment processing task that is a processing task for software executed by the different information processing apparatus,
the processing circuitry is configured to:
request the quality control when all of the network adjustment processing task, the first hardware adjustment processing task, the first software adjustment processing task, the second hardware adjustment processing task, and the second software adjustment processing task are executable; and
determine not to request the execution of the quality control when at least one of the network adjustment processing task, the first hardware adjustment processing task, the first software adjustment processing task, the second hardware adjustment processing task, and the second software adjustment processing task is not executable,
the determination of whether the network adjustment processing task is executable is executed first among the network adjustment processing task, the first hardware adjustment processing task, the first software adjustment processing task, the second hardware adjustment processing task, and the second software adjustment processing task,
the determination of whether the first hardware adjustment processing task is executable is executed before determination of whether the first software adjustment processing task is executable, and
the determination of whether the second hardware adjustment processing task is executable is executed before determination of whether the second software adjustment processing task is executable.

5. An information processing apparatus connected to a network in which quality of communication is controlled, the information processing apparatus comprising:
processing circuitry configured to
communicate with a different information processing apparatus connected to the network; and
request, when the information processing apparatus provides the different information processing apparatus with a service, execution of quality control based on a condition being satisfied, the quality control being control of quality of communication with the different information processing apparatus, the condition being a condition in which a plurality of adjustment processing tasks are executable, and the plurality of adjustment processing tasks being processing tasks to adjust at least one of a resource for provision of the service and a resource for use of the service, wherein: the plurality of adjustment processing tasks includes:
a network adjustment processing task to adjust resources of the network;
a hardware adjustment processing task to adjust hardware resources of at least one of the information processing apparatus and the different information processing apparatus; and
a software adjustment processing task that is a processing task for software executed by at least one of the information processing apparatus and the different information processing apparatus, and
the processing circuitry is configured to:
determine whether the network adjustment processing task, the hardware adjustment processing task, and the software adjustment processing task are executable in sequence: the network adjustment processing task; the hardware adjustment processing task; and the software adjustment processing task;
request, when all of the network adjustment processing task, the hardware adjustment processing task, and the software adjustment processing task are executable, the quality control; and
determine, when at least one of the network adjustment processing task, the hardware adjustment processing task, and the software adjustment processing task is not executable, not to request the execution of the quality control.

6. An information processing apparatus connected to a network in which quality of communication is controlled, the information processing apparatus comprising:
processing circuitry configured to
communicate with a different information processing apparatus connected to the network; and
request, when the information processing apparatus provides the different information processing apparatus with a service, execution of quality control based on a condition being satisfied, the quality control being control of quality of communication with the different information processing apparatus, the condition being a condition in which a plurality of adjustment processing tasks are executable, and the plurality of adjustment processing tasks being processing tasks to adjust at least one of a resource for provision of the service and a resource for use of the service, wherein: the plurality of adjustment processing tasks includes:
a network adjustment processing task to adjust resources of the network;
a first hardware adjustment processing task to adjust hardware resources of the information processing apparatus;
a first software adjustment processing task that is a processing task for software executed by the information processing apparatus;
a second hardware adjustment processing task to adjust hardware resources of the different information processing apparatus; and a second software adjustment processing task that is a processing task for software executed by the different information processing apparatus, the processing circuitry is configured to:

request the quality control when all of the network adjustment processing task, the first hardware adjustment processing task, the first software adjustment processing task, the second hardware adjustment processing task, and the second software adjustment processing task are executable; and determine not to request the execution of the quality control when at least one of the network adjustment processing task, the first hardware adjustment processing task, the first software adjustment processing task, the second hardware adjustment processing task, and the second software adjustment processing task is not executable, the determination of whether the network adjustment processing task is executable is executed first among the network adjustment processing task, the first hardware adjustment processing task, the first software adjustment processing task, the second hardware adjustment processing task, and the second software adjustment processing task, the determination of whether the first hardware adjustment processing task is executable is executed before determination of whether the first software adjustment processing task is executable, and the determination of whether the second hardware adjustment processing task is executable is executed before determination of whether the second software adjustment processing task is executable.

* * * * *